(12) United States Patent
Shirasaka et al.

(10) Patent No.: US 12,135,294 B2
(45) Date of Patent: Nov. 5, 2024

(54) IMAGING DEVICE, INSPECTION APPARATUS AND INSPECTION METHOD

(71) Applicant: TOYO SEIKAN CO., LTD., Tokyo (JP)

(72) Inventors: Tatsuya Shirasaka, Kanagawa (JP); Takayuki Tochigi, Kanagawa (JP); Osamu Hatano, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 237 days.

(21) Appl. No.: 17/727,191

(22) Filed: Apr. 22, 2022

(65) Prior Publication Data

US 2022/0244192 A1    Aug. 4, 2022

Related U.S. Application Data

(63) Continuation of application No. PCT/JP2020/042141, filed on Nov. 11, 2020.

(30) Foreign Application Priority Data

Nov. 15, 2019  (JP) ................................ 2019-206855

(51) Int. Cl.
*G01N 21/88* (2006.01)
*G01N 21/25* (2006.01)

(52) U.S. Cl.
CPC ....... *G01N 21/8851* (2013.01); *G01N 21/251* (2013.01); *G01N 2021/8812* (2013.01)

(58) Field of Classification Search
CPC ............. G01N 21/8851; G01N 21/251; G01N 2021/8812; G01N 2201/0634; B41F 33/0036
See application file for complete search history.

(56) References Cited

U.S. PATENT DOCUMENTS 5,684,530 A * 11/1997 White .................. H04N 1/0286
  348/125
5,842,060 A * 11/1998 White .................. G03B 27/323
  362/291

(Continued)

FOREIGN PATENT DOCUMENTS

JP    S64-038637 A    2/1989
JP    H06-331564 A    12/1994

(Continued)

OTHER PUBLICATIONS

ISA cited in PCT/JP2020/042141 filed Nov. 11, 2020; (PCT/ISA/210).

(Continued)

*Primary Examiner* — Hung V Nguyen
(74) *Attorney, Agent, or Firm* — BACON&THOMAS,PLLC

(57) ABSTRACT

An imaging device configured to image a printed state of a target surface of a target object for inspection includes: a first light source; a diffuser including an inner periphery surface covered with a diffuse reflection material, and configured to diffusely reflect light emitted from the first light source and emit diffusely reflected light to the target surface; and a line sensor configured to receive light resulting from reflecting the diffusely reflected light from the target surface.

22 Claims, 11 Drawing Sheets

(56) References Cited

U.S. PATENT DOCUMENTS

| | | | |
|---|---|---|---|
| 8,810,810 B2* | 8/2014 | Ohama | G01N 21/86 |
| | | | 358/1.12 |
| 2013/0271764 A1 | 10/2013 | Margraf et al. | |
| 2016/0305871 A1* | 10/2016 | Gerst, III | G01N 21/8806 |

FOREIGN PATENT DOCUMENTS

| | | |
|---|---|---|
| JP | H08-014846 A | 1/1996 |
| JP | H09-300596 A | 11/1997 |
| JP | 2000-283851 A | 10/2000 |

OTHER PUBLICATIONS

ISA cited in PCT/JP2020/042141 filed Nov. 11, 2020; (PCT/ISA/237).

ISR cited in PCT/JP2020/042141 filed Nov. 11, 2020; (Machine Translation Second Sheet—PCT/ISA/210).

* cited by examiner

| | RESPONSIVENESS TO FILM THICKNESS OF INK | | |
|---|---|---|---|
| | REFERENCE EXAMPLE | FIRST MODE DIFFUSELY REFLECTED LIGHT AND DIRECT LIGHT | SECOND MODE DIFFUSELY REFLECTED LIGHT |
| DIFFUSER | NOT USE | USE | USE |
| LIGHT SOURCE | FIRST AND SECOND | FIRST AND SECOND | FIRST |
| KIND OF INK — WHITE | × | × | ○ |
| GOLD | △ | ○ | — |
| ORANGE | ○ | ○ | — |
| RED | × | ○ | — |
| DEEP RED | △ | ○ | — |
| PEONY PINK | △ | ○ | — |
| TURQUOISE | ○ | ○ | — |
| GREEN | × | ○ | — |
| INDIGO | △ | ○ | — |
| PURPLE | ○ | ○ | — |
| INK BLACK | △ | ○ | — |

*FIG. 6*

IMAGING DEVICE, INSPECTION APPARATUS AND INSPECTION METHOD

CROSS-REFERENCE TO RELATED APPLICATIONS

The present application is a continuation application of PCT international application No. PCT/JP2020/042141 filed on Nov. 11, 2020 which claims priority from Japanese Patent Application No. 2019-206855 filed on Nov. 15, 2019, and the entire contents of which are hereby incorporated by reference.

BACKGROUND

1. Technical Field

The present invention relates to an imaging device, an inspection apparatus and an inspection method.

2. Related Art

There has been known an apparatus configured to receive reflected light from a target surface and know the state of the target surface, which is disclosed, for example, in Japanese Patent Laid-Open No. 2000-283851 (hereinafter "JP2000-283851").

JP2000-283851 describes a measurement device including first, second, and third illumination members configured to illuminate the surface of a measured sample at illumination angles different from each other, and a memory configured to store a plurality of constants corresponding to the illumination angles, respectively. The measurement device described in JP2000-283851 includes a measurement controller configured to cause the illumination members to individually emit light, and a light-receiving member configured to receive a component of the reflected light from the measured sample in the normal direction of the sample surface and output an electric signal according to the light intensity. The measurement device described in JP2000-283851 includes an arithmetic processing unit configured to calculate the reflecting properties of the measured sample corresponding to the illumination angles by using electric signals, and calculate a composite reflecting property of the measured sample by using the reflecting properties and the constants corresponding to the reflecting properties.

SUMMARY

The imaging device according to the invention configured to image a printed state of a target surface of a target object for inspection includes: a first light source; a diffuser including an inner periphery surface covered with a diffuse reflection material, and configured to diffusely reflect light emitted from the first light source and emit diffusely reflected light to the target surface; and a line sensor configured to receive light resulting from reflecting the diffusely reflected light from the target surface.

BRIEF DESCRIPTION OF THE DRAWINGS

FIG. 6 illustrates the result of recognizing the responsiveness of calorimetric values to the film thickness of ink by using the inspection apparatus;

DETAILED DESCRIPTION

With the related art described in JP2000-283851, it is difficult to accurately measure the reflecting property of the sample surface because the sample surface is merely illuminated with diffusely reflected light. Accordingly, with the related art described in JP2000-283851, even though it is intended to know the printed state of the sample surface based on the measured value of the reflecting property of the sample surface, it is difficult to easily obtain the accurate state.

The present invention has been achieved considering the above-described circumstances to address the above-described problems. It is therefore an object of the invention to easily and accurately know the printed state of a target surface.

Hereinafter, embodiments of the invention will be described with reference to the drawings. The embodiments described later illustrate some examples of the invention, but do not limit the subject matter of the invention. In addition, all the configurations and the operations described in the embodiments are not necessarily essential as the configurations and the operations of the invention.

Embodiment 1: Configuration of Inspection Apparatus

Figure 1:
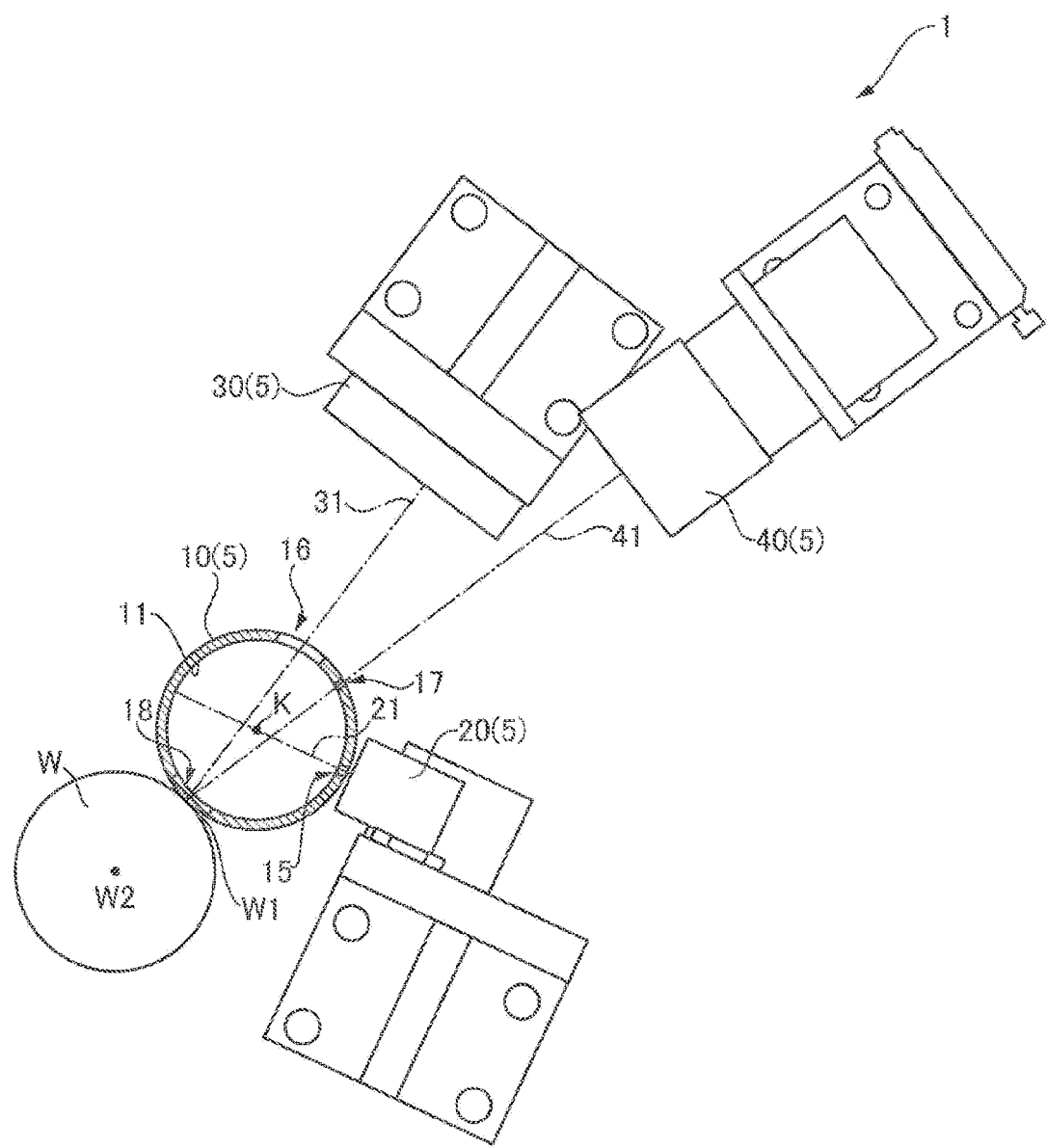
FIG. 1 is a top view illustrating the configuration of an inspection apparatus according to Embodiment 1.
Figure 2:
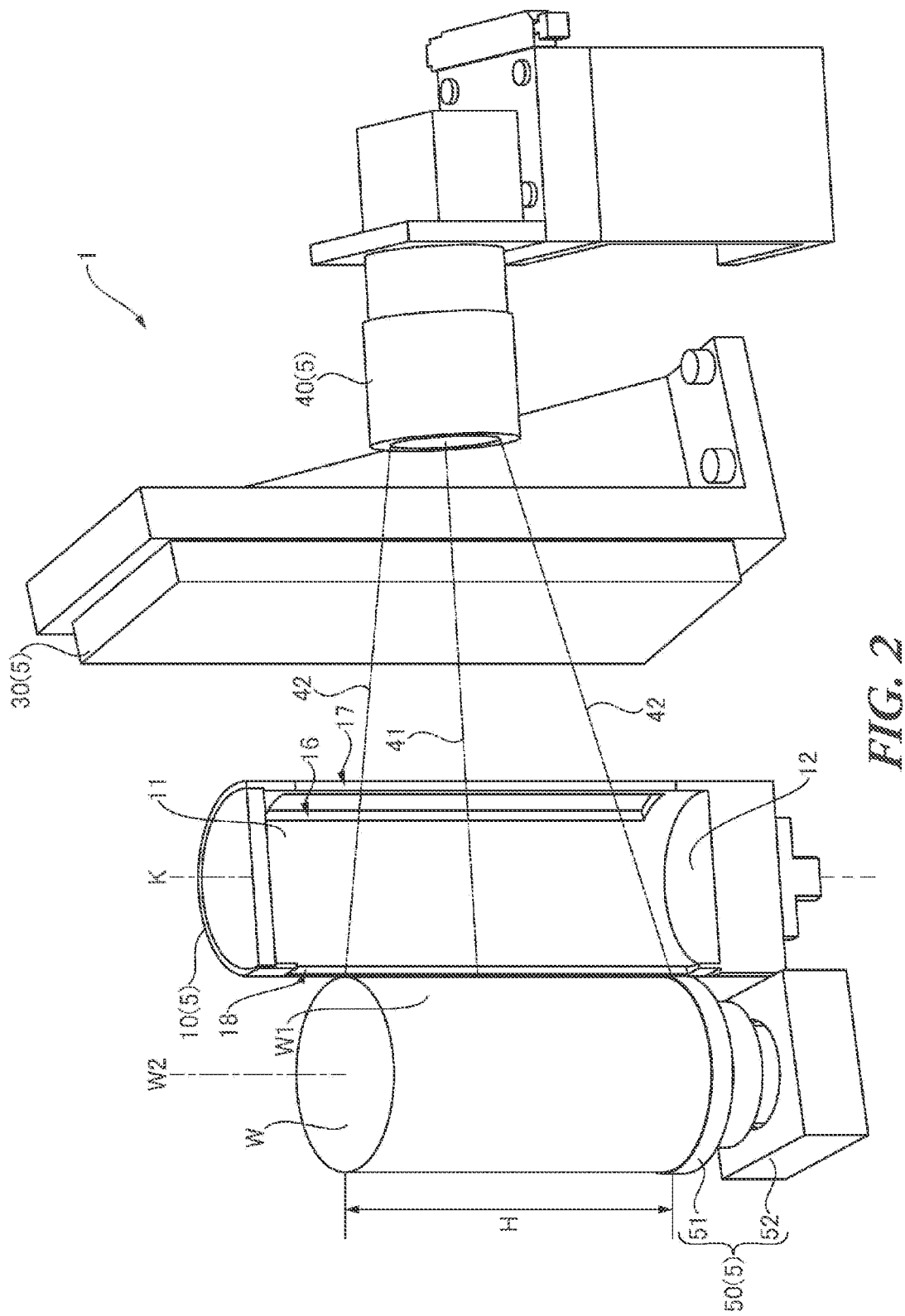
FIG. 2 is a perspective view illustrating the configuration of the inspection apparatus illustrated in FIG. 1.
Figure 3:
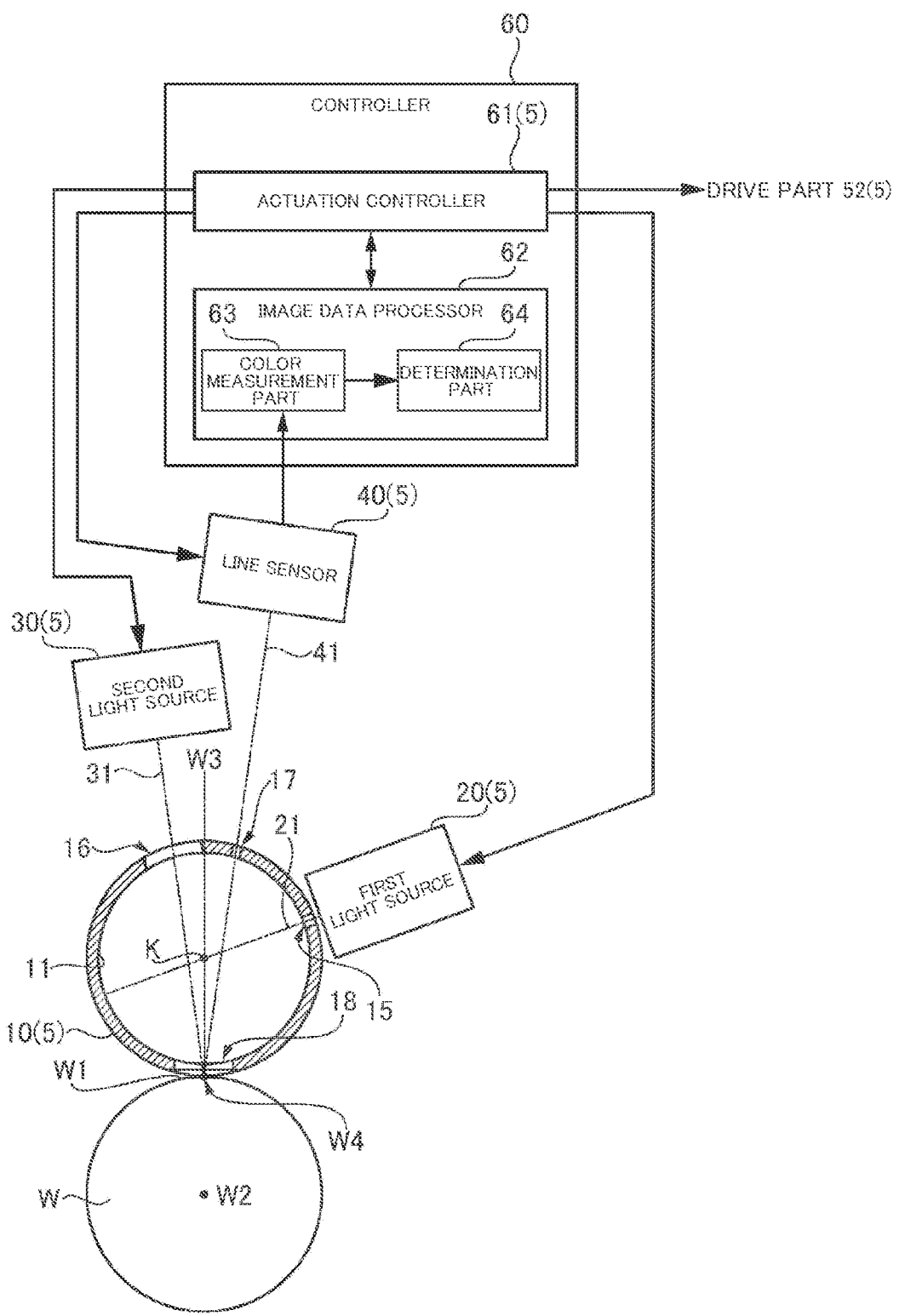
FIG. 3 illustrates the functional configuration of the inspection apparatus illustrated in FIG. 1.
Figure 4:
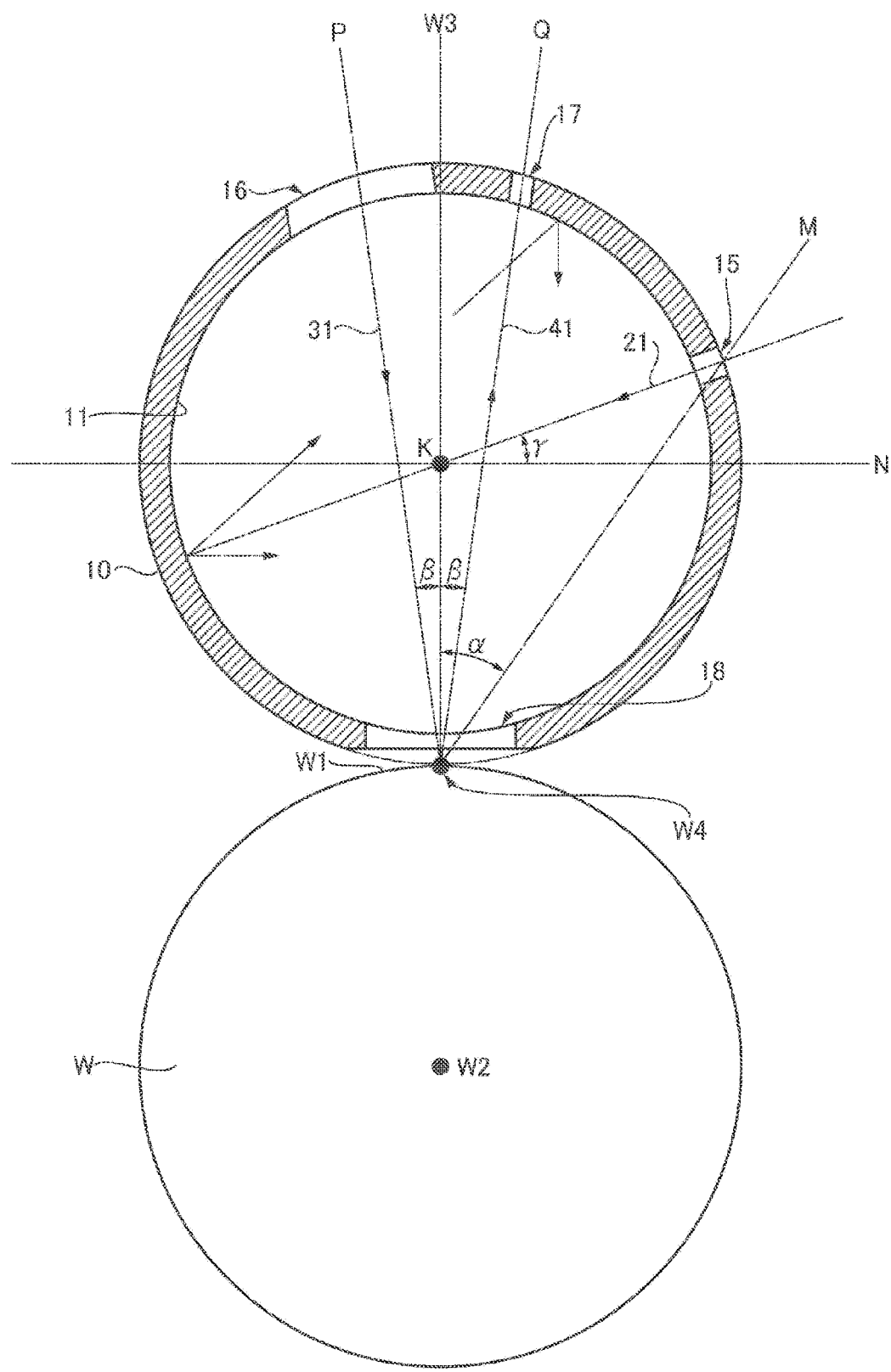
FIG. 4 illustrates the positional relationship among a target surface, a diffuser, a first light source, a second light source, and a line sensor.

FIG. 1 is a top view illustrating the configuration of an inspection apparatus 1 according to Embodiment 1. FIG. 2 is a perspective view illustrating the configuration of the inspection apparatus 1 illustrated in FIG. 1. FIG. 3 illustrates the functional configuration of the inspection apparatus 1 illustrated in FIG. 1. FIG. 4 illustrates the positional relationship among a target surface W1, a diffuser 10, a first light source 20, a second light source 30, and a line sensor 40.

Here, a rotation mechanism (movement mechanism) 50 and a controller 60 are not illustrated in FIG. 1. FIG. 2 illustrates a state where the diffuser 10 is cut in the direction along a central axis K, and the first light source 20 and the controller 60 are not illustrated in FIG. 2. In FIG. 3, the rotation mechanism 50 is not illustrated.

FIG. 4 illustrates a cross section obtained by cutting the diffuser 10 along a plane orthogonal to the central axis K of an inner peripheral surface 11.

The inspection apparatus 1 is configured to inspect the printed state of the target surface W1 of a target object for inspection. The inspection apparatus 1 includes an imaging device 5 configured to illuminate the target surface W1 and receive reflected light from the target surface W1 to acquire image data of the target surface W1. The target surface W1 is a target to be imaged by the imaging device 5. The inspection apparatus 1 acquires calorimetric values of the target surface 1 based on the image data of the target surface W1, and inspects the printed state of the target surface W1 based on the calorimetric value.

At least part of the target surface W1 includes a curved surface being convex to the diffuser 10 and having the center of curvature on an axis along the longitudinal direction of the diffuser 10. The curved surface of the target surface W1 is drawn by moving the generating line of the target surface 1 parallel to a curvature center line W2 around the curvature center line W2 as the rotation axis. For example, when the object targeted for inspection is a cylinder, a curved surface which is the side surface of the cylinder can be a target surface. With Embodiment 1, a cylindrical metal can such as two-piece can is an object targeted for inspection (hereinafter, "target object W"), and the outer peripheral surface of the metal can including a metallic shiny base on which printing is applied is the target surface W1. With Embodiment 1, the curvature center line W2 of the target surface W1 is the same as the central axis of the target object W.

As illustrated in FIG. 1 to FIG. 3, the inspection apparatus 1 includes the diffuser 10, the first light source 20, the second light source 30, the line sensor 40, the rotation mechanism 50, and the controller 60. The diffuser 10, the first light source 20, the second light source 30, and the line sensor 40 constitute the imaging device 5 provided in the inspection apparatus 1. In addition to these components, the imaging device 5 may include an actuation controller 61 (described later) of the controller 60 and the rotation mechanism 50.

The diffuser 10 is a hollow cylinder, and at least part of the inner peripheral surface 11 of the diffuser 10 includes a curved surface having the center of curvature on the central axis of the diffuser 10. As the diffuser 10, for example, a cylinder may be adopted. The inner peripheral surface 11 of the diffuser 10 is evenly covered with a diffuse reflective material, and functions as a substitute for a so-called integrating sphere. The diffuse reflective material is made of barium sulphate or polytetrafluoroethylene (PTFE) in general, but this is by no means limiting as long as the diffuse reflective material is white paint or material having a high diffuse reflection factor. It is preferred that also the inner side of a bottom surface 12 of the diffuser 10 is evenly covered with the diffuse reflective material. The diffuser 10 is disposed such that the longitudinal direction of the diffuser 10 is approximately parallel to the generating line of the target surface W1, and illuminates the target surface W1 with diffusely reflected light from the inner peripheral surface 11.

The diffuser 10 includes a first light source port 15, a second light source port 16, a line sensor port 17, and a target surface port 16.

The first light source port 15 is configured to allow the light emitted from the first light source 20 to the inner peripheral surface 11 to enter into the diffuser 10. The first light source port 15 may be formed in a slit shape extending along the generating line of the target surface W1 (the longitudinal direction of the diffuser 10).

Here, as illustrated in FIG. 4, the generating line of the target surface W1, which intersects a normal line W3 of the target surface W1 intersecting the central axis K of the inner peripheral surface 11 of the diffuser 10 is defined as a reference generating line W4. It is preferred that the normal line W3 is the normal line of the target surface W1 orthogonal to the central axis K of the inner peripheral surface 11. It is preferred that the reference generating line W4 is orthogonal to the normal line W3 orthogonal to the central axis K and is parallel to the central axis K of the inner peripheral surface 11.

As illustrated in FIG. 4, the first light source port 15 is formed in a position where a plane M containing the reference generating line W4 and forming an angle α with respect to the normal line 813 intersects the diffuser 10. The angle α is, for example, 35 degrees. The first light source port 15 is formed more apart from the target surface W1 than a plane N containing the central axis K of the inner peripheral surface 11 of the diffuser 10 and being orthogonal to the normal line W3. The length of the first light source port 15 along the generating line of the target surface W1 may be greater than a length H of the Generating line of the target surface W1. The second light source port 16 is formed in a slit shape extending along the generating line of the target surface W1 (the longitudinal direction of the diffuser 10), and configured to allow the light emitted from the second light source 30 to the target surface Hi to enter into the diffuser 10.

As illustrated in FIG. 4, the second light source port 16 is formed in a position where a plane P containing the reference generating line W4 and forming an angle β with respect to the normal line W3 intersects the diffuser 10. The angle β may be 0 to 90 degrees as long as the light does not interfere with the light source or the sensor. With the embodiment, the angle β is 8 degrees. Here, the configuration related to the dimension of the second light source port 16 will be described later with reference to FIGS. 5A and 5B.

The line sensor port 17 is formed in a slit shape extending along the generating line of the target surface W1 (the longitudinal direction of the diffuser 10), and configured to allow irregularly reflected light and regularly reflected light from the target surface W1 to be emitted to the line sensor 40.

As illustrated in FIG. 4, the line sensor port 17 is formed in a position where a plane Q containing the reference generating line W4 and being line-symmetric to the plane P with respect to the normal line W3 intersects the diffuser 10. The plane Q forms the angle β with respect to the normal line W3. The length of the line sensor port 17 along the generating line of the target surface W1 may be longer than the length H of The generating line of The target surface W1 as illustrated in FIG. 2.

The target surface port 18 is formed in a slit shape extending along the generating line of the target surface W1 (the longitudinal direction of the diffuser 10). The target surface port 18 allows the light having entered from the first light source port 15 and been diffusely reflected from the inner peripheral surface 11 to be emitted to the target surface W1. Meanwhile, the target surface port 18 allows the light having entered from the second light source port 16 not to be reflected from the inner peripheral surface 11 but to pass through the diffuser 10 and to be emitted to the target surface W1 as direct light. The target surface port 18 is configured to allow reflected light to enter into the diffuser 10. Here, the reflected light includes irregularly reflected light and regularly reflected light resulting from reflecting the diffusely reflected light and the direct light from the target surface W1. The target surface port 18 is formed in a position where the target surface port 18 faces the reference generating line and the normal line W3 intersects the diffuser 10. The length of the target surface port 18 along the generating line of the target surface W1 may be longer than the length H of the generating line of the target surface W1 as illustrated in FIG. 2.

The light emitted from the first light source 20 is diffusely reflected from the inner periphery surface 11 of the diffuser 10, and illuminates the target surface W1 as diffusely reflected light. The first light source 20 is disposed outside the diffuser 10, facing the inner periphery surface 11. The first light source 20 is disposed such that its optical axis 21 extends from the outside of the diffuser 10 to the inner peripheral surface 11.

To be more specific, the first light source 20 is disposed more apart from the target surface W1 than the plane N, and disposed such that the optical axis 21 extends to a position of the inner periphery surface 11 closer to the target surface W1 than the plane N as illustrated in FIG. 4. By this means, the light emitted from the first light source 20 passes through the first light source port 15, is diffusely reflected from the inner periphery surface 11 several times, and then can enter the target surface W1. That is, the first light source 20 is prevented from illuminating the target surface W1 with the light not having been diffusely reflected from the inner peripheral surface 11, or the light having been diffusely reflected from the inner peripheral surface 11 only once, and can illuminate the target surface W1 with the diffusely reflected light which has been diffusely reflected from the inner peripheral surface 11 several times and therefore is homogenous.

The light emitted from the second light source 30 is not reflected from the inner periphery surface 11 of the diffuser 10, but passes through the diffuser 10 and illuminates the target surface W1 as direct light. The second light source 30 is disposed outside the diffuser 10, facing the target surface W1. The second light source 30 is disposed such that ice optical axis 31 extends from The outside of the diffuser 10 to the target surface W1.

To be more specific, the second light source 30 is disposed such that the optical axis 31 is contained in the plane P and extends to the target surface W1 as illustrated in FIG. 4. That is, the second light source 30 is disposed such that the optical axis 31 forms a certain angle β with respect to the normal line W3 and extends from the outside of the diffuser 10 to the target surface W1. By this means, the light emitted from the second light source 30 passes through the second light source port 16 and can enter the target surface W1 at the angle β without being reflected from the inner periphery surface 11. That is the second light source 30 can illuminate the target surface 1 with direct light which has not been reflected from the inner peripheral surface 11 but has passed through the diffuser 10. Here, the configuration related to the dimension of the second light source 30 will be described later with reference to FIGS. 5A and 5B.

The first light source 20 and the second light source 30 adopt illumination to emit light in the visible light region. For the illumination, a common spectral waveform may be adopted because white balance correction is performed by the camera side. However, it is difficult to correct the while balance separately between a first mode and a second mode described later, and therefore it is desired that the spectral waveform is the same or similar between the first light source 20 and the second light source 30.

The line sensor 40 receives irregularly reflected light resulting from reflecting the diffusely reflected light from the target surface W1, and receives regularly reflected light resulting from regularly reflecting the direct light emitted from the second light source 30 from the target surface W1. The line sensor 40 is disposed such that an array direction of its light-receiving elements extends along the generating line of the target surface W1, that is, along the curvature center line W2 and the reference generating line W4 (along the longitudinal direction of the diffuser 10). The line sensor 40 converts the received light into an electric signal to acquire image data of the target surface W1, and outputs the image data to the controller 60. Here, a device to acquire the image data of the target surface W1 is not limited to the line sensor 40, but various sensors such as an area sensor and a camera which can acquire image data are applicable.

To be more specific, the line sensor 40 is disposed such that its optical axis 41 is contained in the plane Q and extends to the target surface as illustrated in FIG. 4. That is, the line sensor 40 is disposed such that the optical axis 41 forms the angle β with respect to the normal line W3 and extends from the outside of the diffuser 10 to the target surface W1. By this means, the light emitted from the first light source 20 is diffusely reflected in the diffuser 10 to become diffusely reflected light, and is reflected from the target surface W1 to become irregularly reflected light, and then passes through the line sensor port 17 and enters the line sensor 40. In addition, the light emitted from the second light source 30 and regularly reflected from the target surface W1 at the angle β to become regularly reflected light passes through the line sensor port 17 and can enter the line sensor 40. That is, the line sensor 40 can receive the irregularly reflected light from the target surface W1 and the regularly reflected light from the target surface W1. Here, the configuration related to the layout or the line sensor 40 will be described later with reference to FIGS. 5A and 5B.

The positional relationship among the target surface W1, the ports 15 to 18 of the diffuser 10, the first light source 20, the second light source 30, and the line sensor 40 is held as illustrated in FIG. 4. By this means, the light emitted from the first light source 20 is diffusely reflected in the diffuser 10 to become diffusely reflected light, and is irregularly reflected and regularly reflected from the target surface and then only the irregularly reflected light is mainly received by the line sensor 40. This is because the second light source port 16 is located to make regular reflection with respect to the line sensor 40, and therefore the light is not diffusely reflected from the second light source port 16, and the diffusely reflected light does not contain regular reflection component having the angle to make the regular reflection with respect to the line sensor 40. Meanwhile, the light emitted from the second light source 30 is irregularly reflected and regularly reflected from the target surface W1, and only the regularly reflected light is mainly received by the line sensor 40. Therefore, the first light source 20 mainly functions as a light source of the irregularly reflected light from the target surface W1, which is received by the line sensor 40, and the second light source 30 mainly functions as a light source of the regularly reflected light from the target surface W1, which is received by the line sensor 40.

The atmosphere temperature of the location where the first light source 20, the second light source 30, and the line sensor 40 are installed affects the light-receiving sensitivity of the line sensor 40, and the amount of light emitted from the light sources. Therefore, it is preferred that the atmosphere temperature is changed within plus or minus 2 degrees Celsius.

The rotation mechanism 50 (movement mechanism) moves the target surface W1 relative to the line sensor 40 in the direction intersecting the array direction of the light-receiving elements of the line sensor 40. With the embodiment, the rotation mechanism 50 rotates the target object W about the center of curvature of the target surface W1 as the rotation axis. As illustrated in FIG. 2, the rotation mechanism 50 includes a holder 51 configured to hold the target object W, and a drive part 52 configured to rotate the holder 51. The holder 51 may be a mandrel or a table. The drive part 52 may be a motor.

The controller 60 is configured to comprehensively control the components of the inspection apparatus 1. The controller 60 includes a processor and a memory, and is configured as a computer including a program implementing the function of the inspection apparatus 1.

The controller 60 controls the actuation of the first light source 20, the second light source 30, the line sensor 40, and the rotation mechanism 50, and acquires the image data of the target surface W1. In addition, the controller 60 acquires the colorimetric value of the target surface W1 based on the acquired image data, and inspects the printed state of the target surface W1 based on the acquired calorimetric value. With the embodiment, processing of controlling the actuation of the first light source 20, the second light source 30, the line sensor 40, and the rotation mechanism 50 to acquire the image data of the target surface W1 may be referred to as "image data acquisition processing." In addition, with the embodiment, processing of acquiring the colorimetric value of the target surface W1, based on the image data acquired by the image data acquisition processing to inspect the printed state of the target surface W1 may be referred to as "inspection processing." Moreover, with the embodiment, a method of inspecting the printed state of the target surface W1 by performing the inspection processing may be referred to as "inspection method." Details of the image data acquisition processing and the inspection processing will be described later with reference to FIG. 9 and FIG. 10.

As illustrated in FIG. 3, the controller 60 includes an actuation controller 61 and an image data processor 62.

The actuation controller 61 controls the actuation of the first light source 20, the second light source 30, the line sensor 40, and the rotation mechanism 50 to perform the image data acquisition processing. The actuation controller 61 actuates the first light source 20, the second light source 30, and the line sensor 40 so that the target surface W1 can be illuminated to acquire the image data of the target surface W1 in two different modes, first mode and second mode.

In the first mode, the first light source 20 and the second light source 30 are turned on to illuminate the target surface W1, and the irregularly reflected light and the regularly reflected light from the target surface W1 is received by the line sensor 40. In other words, in the first mode, the target surface W1 is illuminated with the diffusely reflected light having been diffusely reflected and entering the target surface W1, and the target surface W1 is illuminated with the direct light not having been diffusely reflected but entering the target surface W1, and the irregularly reflected light and the regularly reflected light from the target surface W1 are received.

In the second mode, the first light source 20 is turned on and the second light source 30 is turned off to illuminate the target surface W1, and the irregularly reflected light from the target surface W1 is received by the line sensor 40. In other words, in the second mode, the target surface W1 is illuminated with the diffusely reflected light having been diffusely reflected and entering the target surface W1, and the irregularly reflected light from the target surface W1 is received. In this case, the second light source port 16 of the diffuser 10 remains to open, and therefore the diffusely reflected light illuminating the target surface W1 does not contain regular reflection component to make regular reflection with respect to the line sensor 40. Accordingly, the line sensor 40 receives only the irregularly reflected light excluding the regularly reflected light.

Here, with the embodiment, the switching between the first mode and the second mode is achieved by turning on and off the second light source 30, but this is by no means limiting. The switching may be achieved by opening and closing the second light source port 16 with a cover coated with a reflective material, instead of the second light source 30. Meanwhile, when only the first mode is used without switching between the first mode and the second mode, a diffuser without the second light source port 16 may be used. By this means, the diffusely reflected light can contain the regular reflection component to make regular reflection with respect to the line sensor 40. Meanwhile, when only the second mode is used without switching between the first mode and the second mode, the diffuser 10 having a port to let the light go to the position to make regular reflection with respect to the line sensor 40 may be used, or the diffuser 10 part of which is not covered with a diffuse reflective material at the position to make regular reflection with respect to the line sensor 40 may be used, instead of the second light source 30. The relationship between the image data acquired in the first mode or the second mode and the inspection of the printed state will be described later with reference to FIG. 6 to FIG. 8.

The actuation controller 61 controls the actuation of the rotation mechanism 50 in synchronization with the actuation of the first light source 20, the second light source 30, and the line sensor 40. The actuation controller 61 actuates the rotation mechanism 50 to rotate the target surface W1 in the circumferential direction of the target surface W1 several times in the first mode and the second mode. Details of the actuation of the rotation mechanism 50 will be described later with reference to FIG. 9.

The image data processor 62 performs the inspection processing based on the image data acquired by the image data acquisition processing. The image data processor 62 includes a color measurement part 63 configured to acquire the colorimetric value of the target surface W1, based on the image data of the target surface W1 depending on the light received by the line sensor 40, and a determination part 64 configured to determine whether the printed state of the target surface W1 is good or bad, based on the colorimetric value acquired by the color measurement part 63.

The color measurement part 63 converts the image data of the target surface W1 in an RGB color space, which is acquired by the line sensor 40, into an XYZ space, and further into a CIELAB space to acquire colorimetric values such as L* value, a* value, and b* value in an L*a*b* colorimetric system, which do not depend on equipment. By converting the image data into the CIELAB space, it is possible to acquire a change in the brightness, and color difference close to the sensitivity of humans. The color measurement part 63 acquires the calorimetric value for each predetermined area of the image data. The predetermined area may be an area of one pixel, or an area of a plurality of pixels. The color measurement part 63 outputs the acquired colorimetric value to the determination part 64.

The determination part 64 determines whether the color difference such as ΔL* value, Δa* value, Δb* value, ΔE* value, and ΔE00 value between the colorimetric value acquired by the color measurement part 63 and the colorimetric value of the reference image data falls within a tolerance to determine whether the printed state of the target surface W1 is good or bad. The tolerance of the colorimetric value is different for each color. The tolerance of the colorimetric value is preset for each predetermined area of the image data acquired by the line sensor 40. The predetermined area is the same as the above-described predetermined area as a unit to acquire the colorimetric values by the color measurement part 62. The tolerance of the colorimetric value may be defined from the upper limit and the lower limit of the colorimetric values acquired under the condition that the printed state of the target surface W1 is good.

Figure 5A:
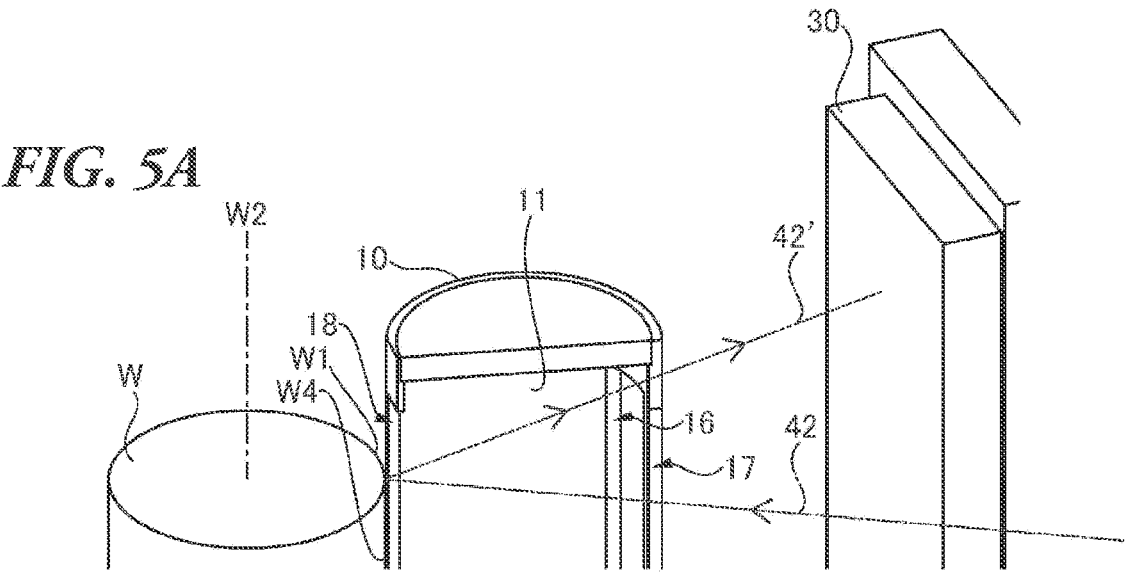
FIGS. 5A and 5B illustrate details of the configuration of a second light source port and the second light source.
Figure 5B:
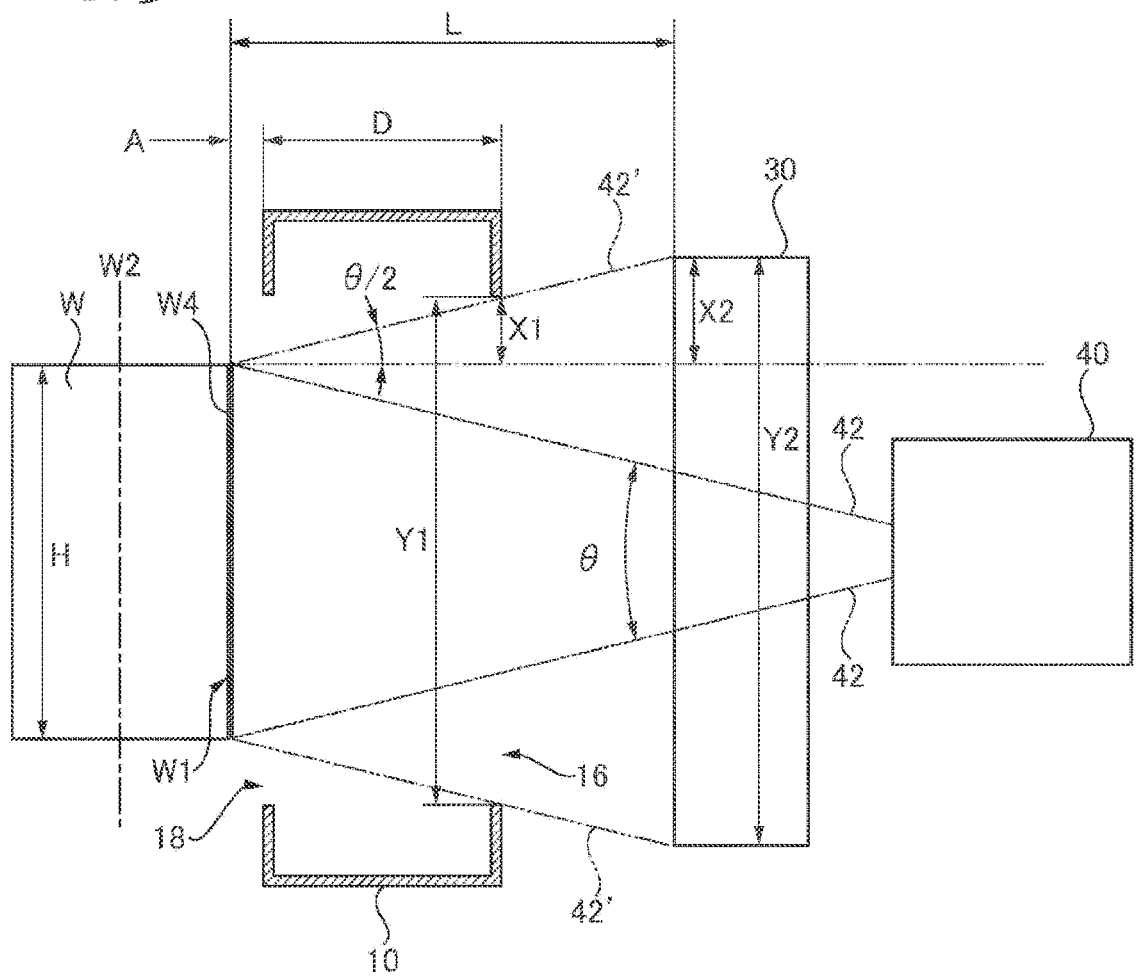

Embodiment 1: Details of Line Sensor, Second Light Source Port, and Second Light Source FIGS. 5A and 5B illustrate details of the configuration of the second light source port 16 and the second light source 30. FIG. 5A is an enlarged view illustrating part of FIG. 2. FIG. 5B schematically illustrates FIG. 5A from the side.

In FIG. 5B, the length of the target surface W1 in the array direction of the light-receiving elements of the line sensor 40 is denoted as H. The length H of the generating line of the target surface W1 is the height dimension of a metal can as the target object W. The distance from the target surface W1 to the diffuser 10 is denoted as A. The distance from the target surface 1 to the second fight source 30 is denoted as L. The diameter of the diffuser 10 is denoted as D. The angle of field of the line sensor 40 with respect to the target surface W1 is denoted as θ. Assuming that the field of view 42 of the line sensor 40 to the target surface W1 is regularly reflected from the target surface W1, a virtual field of view extending to the second light source port 16 and the second light source 30 is denoted as 42'.

The field of view 42 of the line sensor 40 is formed to extend along the generating line of the target surface W1 on the target surface W1. In addition, it is preferred that the length of the field of view 42 of the line sensor 40 along the generating line of the target surface W1 is equal to or longer than the length H of the generating line of the target surface W1. This is because, when the length of the field of view 42 along the generating line on the target surface W1 is shorter than the length H of the generating line, the inspection apparatus 1 needs to scan the line sensor 40 or the target surface W1 in the direction along the generating line of the target surface W1 in order to acquire the image of the target surface W1. Therefore, the line sensor 40 is provided to have a length of the field of view 42 along the generating line on the target surface W1 which is equal to or longer than the length H of the generating line. Here, when the inspection apparatus 1 inspects a partial range of the target surface W1, the length of the field of view 42 along the generating line may be equal to or shorter than the length H of the generating line.

In addition, it is assumed that the field of view 42 of the line sensor 40 to the target surface W1 is regularly reflected from the target surface W1, and reaches the second light source port 16. The length of the virtual field of view 42' along the generating line at the position of the second light source port 16 (the length along the longitudinal direction of the diffuser 10) is denoted as a first predetermined length Y1. A half value of the dimension of a portion in which the predetermined length Y1 is longer than the length H of the generating line is denoted as X1. Then, X1 and Y1 are represented by the following equations (1) and (2).

$$X1 = (A + D)\tan(\theta/2) \quad (1)$$

$$Y1 = 2 \times X1 + H = 2(A + D)\tan(\theta/2) + H \quad (2)$$

When the length of the second light source port 16 along the generating line is equal to or shorter than the first predetermined length Y1, the following event is likely to occur in the above-described second mode in which the first light source 20 is turned on and the second light source 30 is turned off to illuminate the target surface W1. That is, part of the light emitted from the first light source 20 and diffusely reflected in the diffuser 10 is reflected from the inner peripheral surface 11 near the second light source port 16, and illuminates the target surface W1, and consequently is likely to enter the line sensor 40 as the regularly reflected light. This event is departed from the purpose of the second mode in which only the irregularly reflected light from the target surface W1 is received by the line sensor 40, and therefore is likely to diminish the accuracy in the inspection result of the printed state of the target surface W1. Therefore, the length of the second light source port 16 along the longitudinal direction of the diffuser 10 is longer than the predetermined first length Y1.

It is preferred that the distance A from the target surface W1 to the diffuser 10 is short as long as they do not contact one another. It is preferred that the distance A is equal to or shorter than 5 mm, and the variation between each of the target objects W falls within plus or minus 0.5 mm.

In addition, in the second mode in which the first light source 20 is turned on and the second light source 30 is turned off to illuminate the target surface W1, the following event is likely to occur. That is, part of the light emitted from the first light source 20 and diffusely reflected in the diffuser 10 is reflected from the light emitting surface of the second light source 30 and illuminates the target surface W1, and consequently is likely to enter the line sensor 40 as the regularly reflected light. This event is departed from the purpose of the second mode in which only the irregularly reflected light from the target surface W1 is received by the line sensor 40, and therefore is likely to diminish the accuracy in the inspection result of the printed state of the target surface W1. Therefore, the second light source 30 is spaced from the second light source port 16 by a predetermined distance in order to prevent part of the light emitted from the first light source 20 from entering from the second light source port 16 into the diffuser 10 again, even though the part of the light is reflected from the light emitting surface of the second light source 30. By this means, the inspection apparatus 1 can accurately inspect the printed state of the target surface W1 without an optical trap of the diffuser 10.

With the embodiment, as the predetermined distance, the distance from the second light source port 16 to the second light source 30 (L−(A+D) illustrated in FIG. 5B) is set to be equal to or longer than 50 mm. In addition, when the second light source 30 is apart from the second light source port 16 too much, the light illuminating the target surface W1 is weakened, and therefore the upper limit of the predetermined distance is set to be 90 mm. Here, the upper of the predetermined distance may be set appropriately depending on The intensity of The second light source 30.

Moreover, it is assumed that the field of view 42 of the line sensor 40 to the target surface W1 is regularly reflected from the target surface W1, and reaches the second light source 30. The length of the virtual field of view 42' along the generating line at the position of the second light source 30 (the length along the longitudinal direction of the diffuser 10) is denoted as a second predetermined length Y2. A half value of the dimension of a portion in which the second predetermined length Y2 is longer than the length H of the generating line is denoted as X2. Then, X2 and Y2 are represented by the following equations (3) and (4).

$$X2 = L\tan(\theta/2) \quad (3)$$

$$Y2 = 2 \times X2 + H = 2L\tan(\theta/2) + H \quad (4)$$

In a case where the length of the second light source 30 along the generating line is equal to or shorter than the second predetermined length Y2, when the second light source 30 illuminates the target surface W1, an event in which the amount of light is not sufficient near the ends of the generating line of the target surface W1 is likely to occur. This event is likely to diminish the accuracy in the inspection result of the printed state of the target surface W1. Therefore, the second light source 30 is provided to have a length along the generating line which is equal to or longer than the second predetermined length Y2.

In addition, as illustrated in FIG. 4, it is preferred that the intersection of the optical axis 31 of the second light source 30 and the optical axis 41 of the line sensor 40 is located at the vertex of the target surface W1. However, the distance from the second light source 30 and the line sensor 40 to the target object W may be changed due to the variation in the position of the target object W. The change in the distance varies the colorimetric value of the acquired image data, and therefore it is preferred that the amount of change falls within plus or minus 0.5 mm.

Embodiment 1: Calorimetric Performance for Each Kind of Ink

Figure 7:
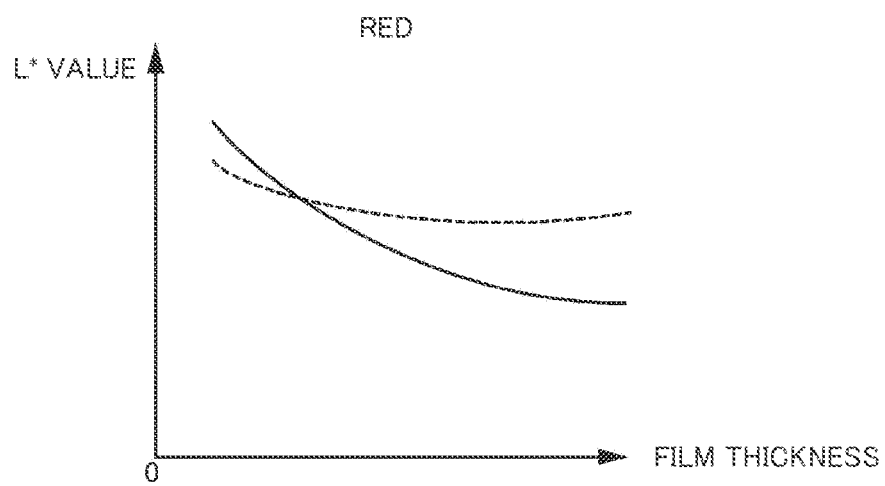
FIG. 7 illustrates a change in a calorimetric value with respect to a change in the film thickness of red ink.
Figure 8:
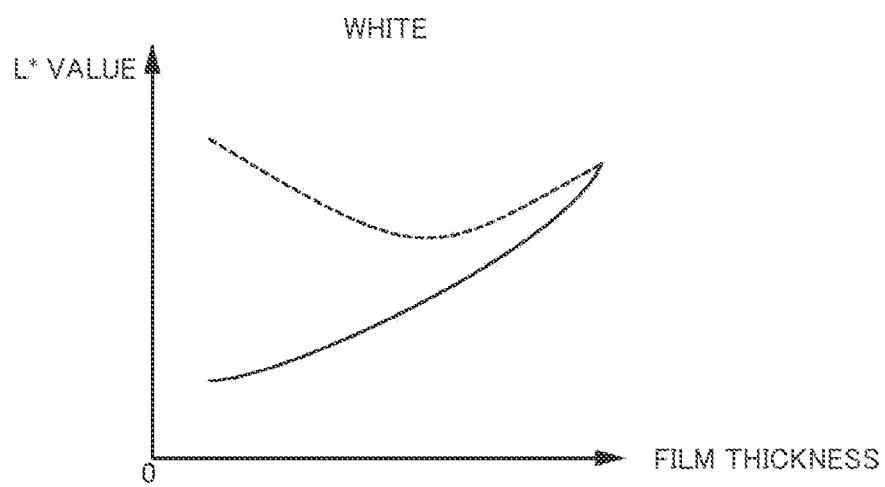
FIG. 8 illustrates a change in a calorimetric value with respect to a change in the film thickness of white ink.

FIG. 6 illustrates the result of recognizing the responsiveness of colorimetric values to the film thickness of ink by using the inspection apparatus 1. FIG. 7 illustrates a change in the colorimetric value with respect to a change in the film thickness of red ink. FIG. 8 illustrates a change in the colorimetric value with respect to a change in the film thickness of white ink.

In FIG. 6, the column of the kinds of ink indicates the colors of typical inks used to print the target surface W1. The row of "light source" indicates whether the responsiveness is recognized by tuning on both the first light source 20 and the second light source 30, or turning on only the first light source 20. The column of "not use" indicates the result of recognizing the responsiveness using the illumination with regular reflection or the illumination with direct irradiation at an angle different from that of the regular reflection, without using diffuser 10. The column of "use" indicates the result of recognizing the responsiveness using the diffuser 10. "x" marks indicate that the responsiveness cannot be recognized. "o" marks indicate that the responsiveness can be sufficiently recognized. "Δ" marks indicate that the responsiveness can be recognized, but is not sufficient.

As illustrated in FIG. 6, when the diffuser 10 is not used, it is seen that some inks indicates that the responsiveness of the colorimetric value to the film thickness of the ink can be recognized, but some inks indicate that the responsiveness of the calorimetric value to the film thickness of the ink cannot be recognized. In contrast, when the diffuser 10 is used, it is seen that most of the typical inks used to print the target, surface W1 indicate that the responsiveness of the calorimetric value to the film thickness of the ink can be recognized.

Hereinafter, specific examples will be described. A solid line illustrated in FIG. 7 indicates the result of recognizing a change in the L* value with respect to a change in the film thickness of the red ink. A broken line illustrated in FIG. 7 indicates the result of recognizing a change in the L* value with respect to a change in the film thickness of the red ink without the diffuser 10. When the film thickness of the ink in colors other than white is increased, a wavelength component of the irradiated white light which is absorbed into the ink is increased, but a wavelength component of the white light which is reflected by the ink is reduced, and therefore the L* value is decreased.

The solid line illustrated in FIG. 7 indicates the relationship in which when the film thickness of the red ink is increased, the L* value is decreased. Here, it is seen that, for the ink in a color other than white, when the diffuser 10 is used, the responsiveness of the colorimetric value to the film thickness of the ink can be sufficiently recognized. On the other hand, the broken line illustrated in FIG. 7 indicates that when the film thickness of the red ink is increased, the L* value is not much changed. Therefore, for the ink in a color other than white, when the diffuser 10 is not used, it is seen that the responsiveness of the calorimetric value to the film thickness of the ink cannot necessarily be sufficiently recognized.

Here, as illustrated in FIG. 6, even though the diffuser 10 is used, when the ink is white and both the first light source 20 and The second light source 30 are turned on, the responsiveness of the calorimetric value to the film thickness of the ink is not sufficiently recognized, but when only the first light source 20 is turned on, the responsiveness is sufficiently recognized.

Hereinafter, specific examples will be described. A solid line illustrated in FIG. 8 indicates the result of recognizing a change in the L* value with respect to a change in the film thickness of the white ink, when the diffuser 10 is used and only the first light source 20 is tuned on. A broken line illustrated in FIG. 8 indicates the result of recognizing a change in the L* value with respect to a change in the film thickness of the white ink, when the diffuser 10 is used and the first light source 20 and the second light source 30 are turned on. When the film thickness of the white ink is increased, a wavelength component of the irradiated white light which is reflected by the ink is increased, but a wavelength component of the white light which is absorbed into the ink is reduced, and therefore the L* value as increased.

The solid line illustrated in FIG. 8 indicates the relationship in which when the film thickness of the white ink is increased, the L* value is increased. Here, it is seen that the responsiveness of the colorimetric value to the film thickness of the white ink is sufficiently recognized when the diffuser 10 is used and only the first light source 20 is turned on. On the other hand, the broken line illustrated in FIG. 8 indicates that when the film thickness of the white ink is reduced, the L* value is decreased once and then increased again. Accordingly, it is seen that even though the diffuser 10 is used, when both the first light source 20 and the second light source 30 are turned on, the responsiveness of the calorimetric value to the film thickness of the white ink cannot be recognized. This is because the base of the target surface W1 is a metallic shiny base made of, for example, aluminum having a high regular reflectance. When the film thickness of the white ink is reduced, the L* value is decreased once, and then when the film thickness of the white ink is further reduced, the impact of the aluminum base having a high regular reflectance is increased. Accordingly, the percentage of the regularly reflected light from the aluminum base which is received by the line sensor 40 is increased.

Thus, in the first mode, the actuation controller 61 of the controller 60 turns on both the first light source 20 and the second light source 30 to illuminate the target surface W1, and the irregularly reflected light and the regularly reflected light from the target surface W1 is received by the line sensor 40. In the second mode, the actuation controller 61 of the controller 60 turns on the first light source 20 and turns off the second light source 30 to illuminate the target surface W1 with the diffusely reflected light, and the light irregularly reflected from the target surface W1 is received by the line sensor 40. The line sensor 40 stores the image data depending on the irregularly reflected light and the regularly reflected light as first image data acquired in the first mode, and stores the image data depending on the irregularly reflected light as second image data acquired in the second mode.

The color measurement part 63 acquires the colorimetric value indicated by the irregularly reflected light and the regularly reflected light based on the first image data, and acquires the colorimetric value indicated by the irregularly reflected light based on the second image data. The determination part 64 determines, for the area of the target surface W1 printed in white, whether the printed state is good or bad, based on a second colorimetric value acquired based on the second image data. Meanwhile, the determination part 64 determines, for the area of the target surface W1 printed in colors other than white (area other than the area which determined about whether the printed state is good or bad using the second colorimetric value), whether the printed state is good or bad, based on a first colorimetric value acquired based on the first image data.

By this means, even though the target surface W1 is printed by the inks in various colors and with various film thicknesses, the inspection apparatus 1 can correctly acquire the calorimetric value of the target surface 1, and therefore accurately inspect the printed state of the target surface W1.

Here, with the embodiment, for the white color, whether the printed state is Good or bad is determined based on the second image data, but this is by no means limiting. The present technique is applicable to colors other than white as long as the colors exhibit a good responsiveness in the second mode as the solid line illustrated in FIG. 8. In addition, with the embodiment, the target surface hi is the outer peripheral surface of a metal can having a circular cylindrical shape, but this is by no means limiting. The present technique is applicable to a flat surface or any curved surface.

Embodiment 1: Image Data Acquisition Processing

Figure 9:
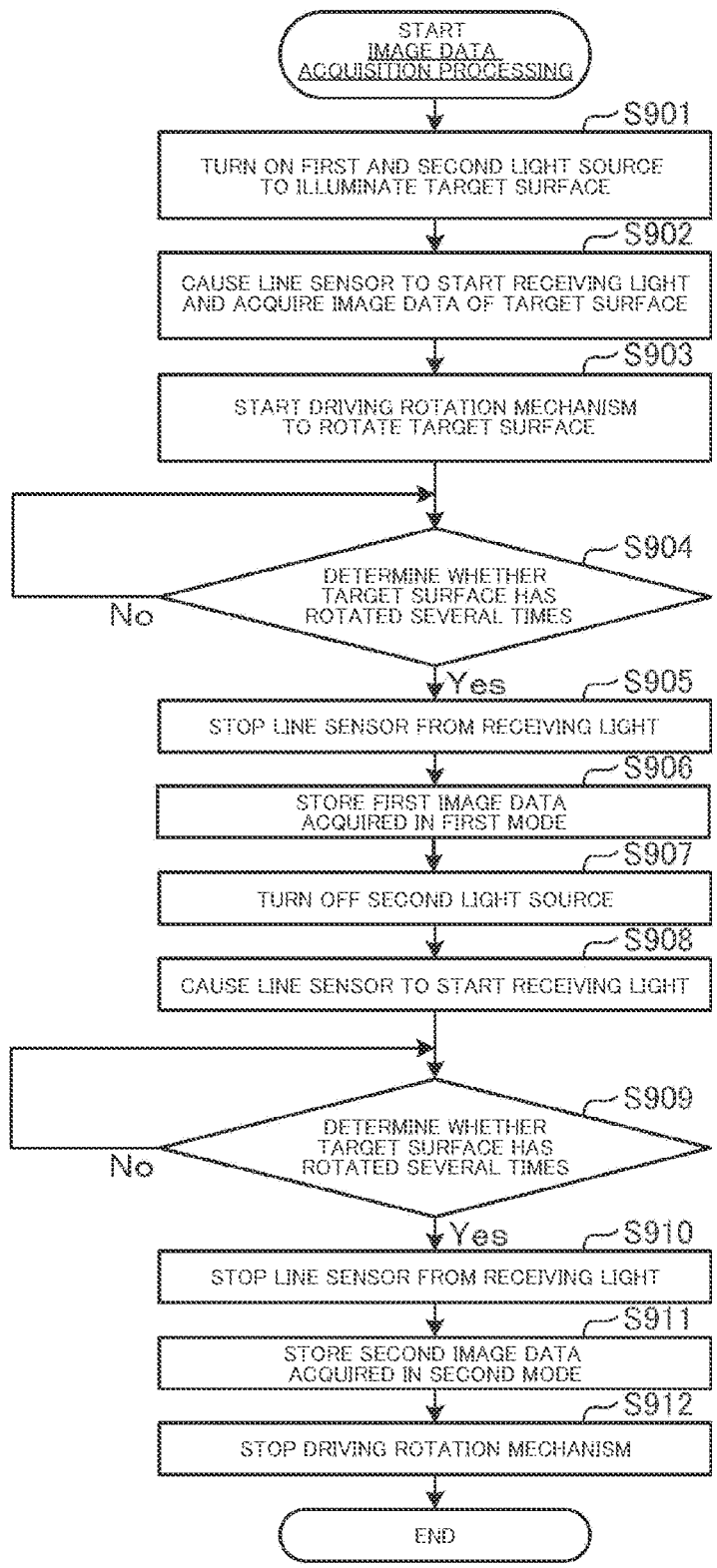
FIG. 9 is a flowchart illustrating image data acquisition processing.

FIG. 9 is a flowchart illustrating image data acquisition processing.

When the target object W is a metal can, the inspection apparatus 1 may be integrated into a manufacturing line including a printer configured to print the target object W. When the target object W is conveyed from the printer to the target surface port 18, the controller 60 of the inspection apparatus 1 performs the image data acquisition processing.

In step S901, the controller 60 turns on the first light source 20 and the second light source 30 to illuminate the target surface W1.

In step S902, the controller 60 causes the line sensor 40 to start receiving light and starts acquiring the image data of the target surface W1. The light received by the line sensor 40 is irregularly reflected light and regularly reflected light from the target surface W1. That is, in the step S901 and the step S902, the controller 60 actuates the first light source 20, the second light source 30, and the line sensor 40 in the first mode.

In step S903, the controller 60 starts driving the rotation mechanism 50 to rotate the target surface W1.

In step S904, the controller 60 determines whether the target surface W1 has rotated in its circumferential direction several times. The controller 60 can determine whether the target surface W1 has rotated in the circumferential direction several times, by referring to a detected value of a rotary encoder provided in the rotation mechanism 50, or a counted value of a timer counter provided in the controller 60. When determining that the target surface W1 has not rotated in the circumferential direction several times, the controller 60 waits until the target surface W1 has rotated in the circumferential direction several times. On the other hand, when determining that the target surface W1 has rotated in the circumferential direction several times, the controller 60 moves the step to step S905.

In the step S905, the controller 60 stops the line sensor 40 from receiving the light. The controller 60 ends the acquisition of the image data of the target surface W1.

In step S906, the controller 60 stores the acquired image data as the first image data acquired in the first mode.

In step S907, the controller 60 turns off the second light source 30.

In step S908, the controller 60 causes the line sensor 40 to start receiving light and starts acquiring the image data of the target surface W1. The second light source 30 is tuned off while the first light source 20 is turned on. The light received by the line sensor 40 is irregularly reflected light from the target surface W1. That is, in the step S907 and the step S908, the controller 60 actuates the first light source 20, the second light source 30, and the line sensor 40 in the second mode.

In step S909, the controller 60 determines whether the target surface W1 has rotated in the circumferential direction several times in the same way as the step S904. When determining that the target surface W1 has not rotated in the circumferential direction several times, the controller 60 waits until the target surface W1 has rotated in the circumferential direction several times. On the other hand, when determining that the target surface W1 has rotated in the circumferential direction several times, the controller 60 moves the step to step S910.

In the step S910, the controller 60 stops the line sensor 40 from receiving the light in the same way as the step S905.

In step S911, the controller 60 stores the acquired image data as the second image data acquired in the second mode.

In step S912, the controller 60 stops driving the rotation mechanism 50. After that, the controller 60 ends the processing. After the end of the processing, the controller 60 performs the inspection processing illustrated in FIG. 10. The target object W targeted for this processing is conveyed to the next process. When a new target object F is conveyed from the printer, the controller 60 performs the processing on the new target object W.

Here, with the embodiment, the first image data is acquired before the second image data. However, the order of acquisition is not limited but either the first image data or the second image data may be acquired first. In addition, the inspection can be performed in one of the first mode or the second mode, one of the first image data and the second image data may be acquired.

For the image data acquisition processing illustrated in FIG. 9, the controller 60 continues to acquire the image data of the target surface W1 while the target surface W1 is rotated in its circumferential direction several times. Therefore, for the image data acquisition processing illustrated in FIG. 9, the controller 60 may acquire the image data in which the target surface W1 is repeatedly shown several times. In a case of the image data for one rotation, the end of the printing may be located at the center of the image data depending on the start position of the acquisition of the image data, and therefore the image data is divided at a halfway position. Accordingly, the controller 60 acquires the image data for at least equal to or greater than two rotations. By this means, even though the start position of the acquisition of the image data is different for each of the target objects W in the circumferential direction of the target surface W1, the controller 60 can acquire the image data in which the entire circumference of the target surface W1 is not divided but is consistently shown. Consequently, when the target object W is conveyed from the printer to the target surface port 18, the inspection apparatus 1 does not need to rotate the target object W in the circumferential direction for alignment but easily aligns the target object W.

Embodiment 1: Inspection Processing

Figure 10:
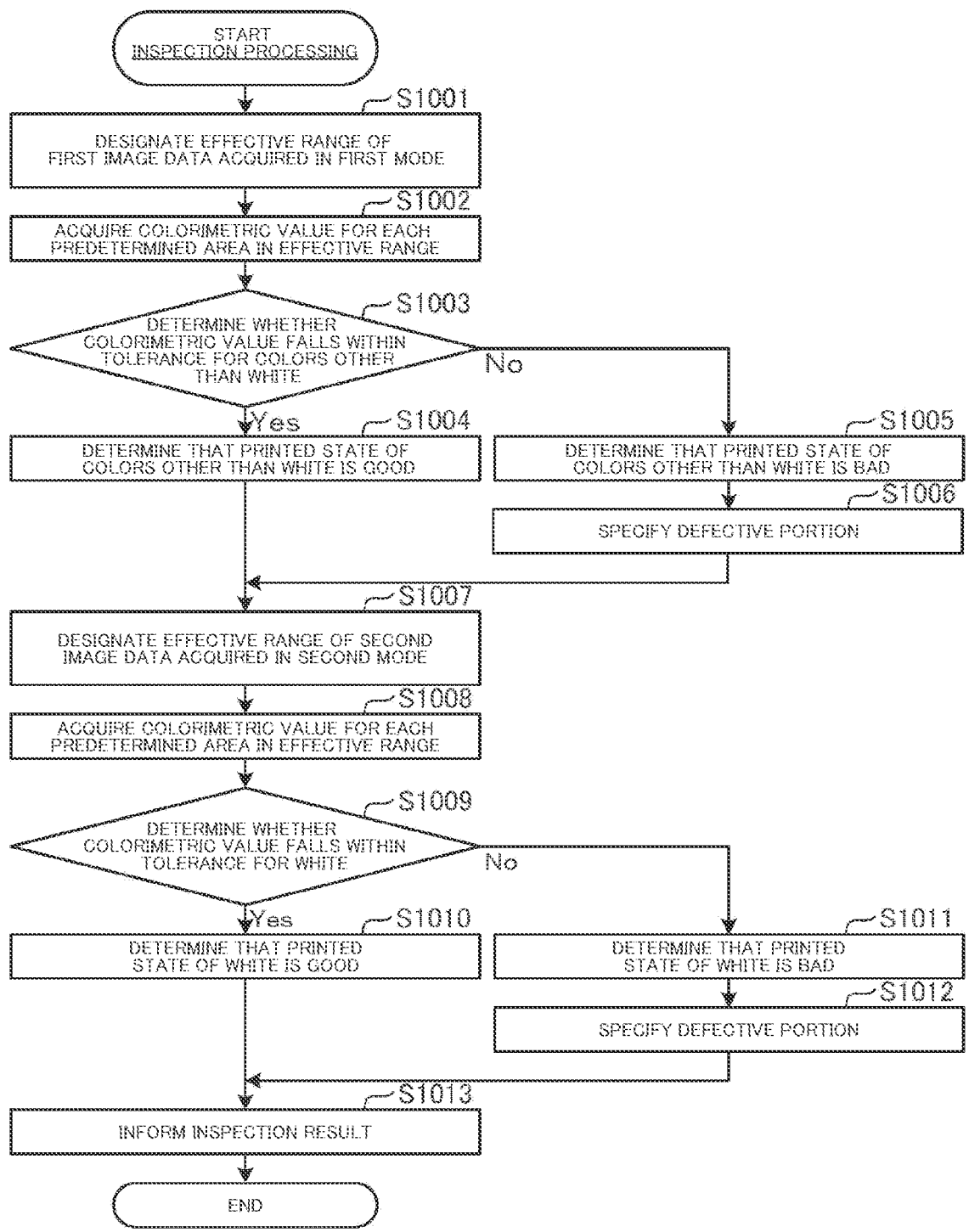
FIG. 10 is a flowchart illustrating inspection processing.

FIG. 10 is a flow chart illustrating the inspection processing.

In step S1001, the controller 60 designates an effective range of the first image data acquired in the first mode. As described above, for the image data acquisition processing illustrated in FIG. 9, the controller 60 rotates the target surface 1 in the circumferential direction several times in each of the first mode and the second mode, and therefore may acquire the image data in which the target surface W1 is repeatedly shown several times. The controller 60 omits parts which are the same as a previously shown part from the image data in which the target surface W1 is repeatedly shown several times, and designates the range in which the target surface W1 for one rotation is shown as the effective range for inspection.

In step S1002, the controller 60 acquires the colorimetric value for each of the predetermined areas in the designated effective range. The predetermined area may be an area for one pixel, or may be an area for a plurality of pixels. The predetermined area is predefined depending on an image printed on the target surface W1.

In step S1003, the controller 60 determines whether the acquired colorimetric value falls within the tolerance for colors other than white. This tolerance is predefined for each of the predetermined areas of the first image data acquired in the first mode. The tolerance is predefined for each color other than white. The predetermined area is the same as the above-described predetermined area as a unit to acquire the colorimetric value in the step S1002. When determining that the acquired calorimetric value does not fall within the tolerance, the controller 60 moves the step to step S1005. On the other hand, when determining that the acquired colorimetric value falls within the tolerance, the controller 60 moves the step to step S1004.

That is, in the step S1001 to the step S1003, the controller 60 determines, for the area of the target surface W1 printed in colors other than white, whether the printed state of the target surface W1 is good or bad, based the colorimetric value acquired based on the first image data acquired in the first mode. In other words, the controller 60 determines, for the area of the target surface W1 printed in colors other than white, whether the printed state of the target surface W1 is good or bad, based on the calorimetric value indicated by the irregularly reflected light and the regularly reflected light from the target surface W1.

In the step S1004, the controller 60 determines that the printed state of the target surface W1 printed in colors other than white is good. After that, the controller 60 moves the step to step S1007.

In the step S1005, the controller 60 determines that the printed state of the target surface W1 printed in colors other than white is bad.

In step S1006, the controller 60 specifies a defective portion. The controller 60 specifies an area of the effective range designated in the step S1001, from which the colorimetric value out of the tolerance is acquired, to specify the defective portion. After that, the controller 60 moves the step to step S1007.

In the step S1007, the controller 60 designates the effective range of the image data acquired in the second mode in the same way as the step S1001.

In step S1008, the controller 60 acquires the calorimetric value for each of the areas in the designated effective range in the same way as the step S1002.

In step S1009, the controller 60 determines whether the acquired colorimetric value falls within a tolerance for white. The tolerance is predefined for each of the predetermined areas of the second image data acquired in the second mode. The predetermined area is the same as the above-described predetermined area as a unit to acquire the colorimetric value in the step S1008. When determining that the acquired calorimetric value does not fall within the tolerance, the controller 60 moves the step to step S1011.

On the other hand, when determining that the acquired calorimetric value falls within the tolerance, the controller 60 moves the step to step S1010.

That is, in the step S1007 to the step S1009, the controller 60 determines, for the area of the target surface W1 printed in white, whether the printed state of the target surface W1 is good or bad, based on the colorimetric value acquired based on the second image data acquired in the second mode. In other words, for the area of the target surface W1 printed in white, the controller 60 determines whether the printed state of the target surface W1 is good or bad, based on the colorimetric value indicated by the irregularly reflected light from the target surface W1.

In the step S1010, the controller 60 determines that the printed state of the target surface W1 printed in white is good. After that, the controller 60 moves the step to step S1013.

In the step S1011, the controller 60 determines that the printed state of the target surface W1 printed in white is bad.

In step S1012, the controller 60 specifies a defective portion in the same way as the step S1006. After that, the controller 60 moves the step to step S1013.

In the step S1013, the controller 60 informs the result of the inspection. For example, the controller 60 displays the results of the step S1004 to the step S1006, and/or the results of the step S1010 to the step 1012 on a display, or transmits these results to a production management device provided outside. The production management device is located far from the inspection apparatus 1 and configured to centrally manage the working state of the manufacturing line into which the inspection apparatus 1 is integrated. In addition, when determining that the printed state is bad, the controller 60 may give an alarm by a speaker and/or a lamp. After that, the controller 60 ends the processing.

Here, with the embodiment, the inspection processing is performed on the first image data before the second image data. However, the order is not limited to this, but either the first image data or the second image data may be subjected to the inspection processing first. In addition, when the inspection proccing can be performed in one of the first mode or the second mode, one of the first image data and the second image data may be subjected to the inspection processing. As described above, the inspection apparatus 1 according to Embodiment 1 includes the imaging device 5. The imaging device 5 includes the first light source 20, the second light source 30, and the diffuser 10 covered with a diffuse reflective material. At least part of the inner peripheral surface 11 of the diffuser 10 includes a curved surface having the center of curvature on the central axis of the diffuser 10. The light emitted from the First light source 20 is diffusely reflected from the inner peripheral surface 11 of the diffuser 10 and illuminates the target surface W1 as diffusely reflected light. Meanwhile, the light emitted from the second light source 30 is not reflected from the inner peripheral surface 11 but passes through the diffuser 10, and illuminates the target surface W1 as direct light. Then, the imaging device 5 includes the line sensor 40 configured to receive irregularly reflected light resulting from reflecting the diffusely reflected light from the target surface W1, and receive regularly reflected light resulting from reflecting the direct light from the target surface W1.

Therefore, for the inspection apparatus 1 according to Embodiment 1, the imaging device 5 can evenly illuminate the curved target surface W1 with the diffused light without using a large integrating sphere, and acquire clear image data of the target surface W1 depending on the irregularly reflected light and the regularly reflected light from the target surface W1. Consequently, for the inspection apparatus 1 according to Embodiment 1, the imaging device 5 can easily and accurately know the printed state of the target surface W1.

Moreover, for the inspection apparatus 1 according to Embodiment 1, at least part of the target surface W1 includes a curved surface being convex to the diffuser 10 and having the center of curvature on an axis along the longitudinal direction of the diffuser 10, and at least part of the inner peripheral surface 11 of the diffuser 10 includes a curved surface having the center of curvature on the central axis of the diffuser 10. In addition, for the inspection apparatus 1 according to Embodiment 1, the imaging device 5 includes the rotation mechanism 50 configured to rotate the target object W around the center of curvature of the target surface W1 as the rotation axis to move the target surface W1 relative to the line sensor 40 in the direction intersecting the array direction of the light-receiving elements of the line sensor 40.

That is, for the inspection apparatus 1 according to Embodiment 1, the imaging device 5 rotates the target surface W1 while illuminating the target surface W1 with the light diffusely reflected from the inner peripheral surface 11 of the diffuser 10 which is formed to adapt to the curved shape of the target surface W1. Therefore, for the inspection apparatus 1 according to Embodiment 1, the imaging device 5 can evenly illuminate the target surface W1 having a circular cylindrical shape with the diffused light without using a large integrating sphere, and smoothly acquire the image data of the target surface W1. By this means, for the inspection apparatus 1 according to Embodiment 1, the imaging device 5 can accurately know the printed state of the target surface W1 including a curved surface even with a simple configuration. Therefore, for the inspection apparatus 1 according to Embodiment 1, the imaging device 5 can easily and accurately know the printed state of the target surface W1.

Moreover, for the inspection apparatus 1 according to Embodiment 1, the first light source 20 is disposed such that its optical axis 21 extends from the outside of the diffuser 10 to the inner peripheral surface 11 of the diffuser 10. The second light source 30 is disposed such that its optical axis 31 forms the certain angle β with respect to the normal line W3 and extends from the outside of the diffuser 10 to the target surface W1. The line sensor 40 is disposed such that its optical axis 41 forms the angle β with respect to the normal line W3 and extends from the outside of the diffuser 10 to the target surface W1, and disposed such that The array direction of the light-receiving elements extends along the generating line of the target surface W1. The diffuser 10 includes the first light source port 15, the second light source port 16, the line sensor port 17, and the target surface port 18 in the positions corresponding to the first light source 20, the second light source 30, the line sensor 40, and the target surface W1, respectively.

Therefore, for the inspection apparatus 1 according to Embodiment 1, even though the first light source 20 and the second light source 30 are not disposed in the diffuser 10, the imaging device 5 can evenly illuminate the target surface W1 having a cylindrical shape with the diffused light. In addition, the line sensor 40 of the imaging device 5 can secure the field of view 42 in conformity to the target surface W1 having a cylindrical shape, and therefore appropriately receive the irregularly reflected light and the regularly reflected light from the target surface W1. By this means, for the inspection apparatus 1 according to Embodiment 1, the imaging device 5 can accurately know the printed state of the target surface W1 while simplifying the structure of the diffuser 10. Therefore, for the inspection apparatus 1 according to Embodiment 1, the imaging device 5 can easily and accurately know the printed state of the target surface W1.

Moreover, for The inspection apparatus 1 according to Embodiment 1, the length of the second light source port 16 along the generating line of the target surface W1 is longer than the first predetermined length Y1. Therefore, when only the first light source 20 illuminates the target surface W1, The imaging device 5 can prevent that The light emitted from the first light source 20 is reflected from the inner peripheral surface 11 near the second light source port 16 and illuminates the target surface W1, and then unexpectedly enters the line sensor 40 as regularly reflected light. By this means, the imaging device 5 can prevent the line sensor 40 from receiving stray light, and therefore can accurately know the printed state of the target surface W1 even with a simple configuration.

Consequently, for the inspection apparatus 1 according to Embodiment 1, the imaging device 5 can easily and accurately know the printed state of the target surface W1.

Moreover, for the inspection apparatus 1 according to Embodiment 1, the length of the second light source 30 along the longitudinal direction of the diffuser 10 is equal to or longer than the second predetermined length Y2. Therefore, when the second light source 30 illuminates the target surface W1, the imaging device 5 can prevent the amount of light from being insufficient near the ends of the target surface W1 in the longitudinal direction. By this means, for the inspection apparatus 1 according to Embodiment 1, the imaging device 5 can accurately know the printed state of the target surface 1 even near the ends of the target surface W1 in the longitudinal direction. Consequently, for the inspection apparatus 1 according to Embodiment 1, the imaging device 5 can easily and accurately know the printed state of the target surface W1.

Furthermore, for the inspection apparatus 1 according to Embodiment 1, the first light source 20 is disposed more apart from the target surface W1 than the plane N containing the central axis K of the inner peripheral surface 11 and being orthogonal to the normal line W3. In addition, the first light source 20 is disposed such that its optical axis 21 extends to a position of the inner periphery surface 11 closer to the target surface W1 than the plane N. Therefore, the imaging device 5 can prevent the first light source 20 from illuminating the target surface W1 with the light not having been diffusely reflected from the inner peripheral surface 11 or the light having been diffusely reflected from the inner peripheral surface 11 only once. By this means, for the inspection apparatus 1 according to Embodiment 1, the imaging device 5 can illuminate the target surface W1 with the homogeneous light diffusely reflected from the inner peripheral surface 11 several times, and therefore accurately know the printed state of the target surface W1 even with a simple configuration. Consequently, with the inspection apparatus 1 according to Embodiment 1, the imaging device 5 can easily and accurately know the printed state of the target surface W1.

Furthermore, for the inspection apparatus 1 according to Embodiment 1, the imaging device 5 actuates the first light source 20, the second light source 30, and the line sensor 40 in the first mode and the second mode. In the first mode, the first light source 20 and the second light source 30 are turned on, and the irregularly reflected light and the regularly reflected light are received by the line sensor 40, and in the second mode, the first light source 20 is turned on and the second light source 30 is turned off, and the irregularly reflected light is received by the line sensor 40. Therefore, even though the diffuser 10 does not include an optical trap, the imaging device 5 can freely switch the light received by the line sensor 40 between both the irregularly reflected light and the regularly reflected light and only the irregularly reflected light. By this means, for the inspection apparatus 1 according to Embodiment 1, the imaging device 5 can accurately know the various printed states of the target surface W1 even with a simple configuration. Consequently, for the inspection apparatus 1 according to Embodiment 1, the imaging device 5 can easily and accurately know the printed state of the target surface W1.

Furthermore, for the inspection apparatus 1 according to Embodiment 1, the imaging device 5 controls the rotation mechanism 50 in synchronization with the actuation of the first light source 20, the second light source 30, and the line sensor 40, and actuates the rotation mechanism 50 to rotate the target surface W1 in the circumferential direction several times in the first mode and the second mode. Therefore, for the inspection apparatus 1 according to Embodiment 1, the imaging device 5 can acquire the image data in which the target surface W1 is repeatedly shown several times. Accordingly, even though the start position of the acquisition of the image data is different for each of the target objects W in the circumferential direction of the target surface W1, the imaging device 5 does not need to rotate the target object W in the circumferential direction for alignment, and therefore easily align the target object W. Consequently, for the inspection apparatus 1 according to Embodiment 1, the imaging device 5 can easily and accurately know the printed state of the target surface W1.

Furthermore, the inspection apparatus 1 according to Embodiment 1 includes the color measurement device 63 configured to acquire the colorimetric value of the target surface W1 based on the image data of the target surface W1 depending on the light received by the line sensor 40, and the determination part 64 configured to determine whether the printed state of the target surface W1 is good or bad based on the colorimetric value acquired by the color measurement part 63. Then, for the inspection apparatus 1 according to Embodiment 1, the determination part 64 determines, for the area of the target surface W1 printed in white, whether the printed state of the target surface W1 is good or bad, based on the colorimetric value indicated by the irregularly reflected light, and also determines, for the area printed in colors other than white (the area other than the area determined about whether the printed state of the target surface W1 is good or bad, based on the colorimetric value indicated by the irregularly reflected light), whether the printed state of the target surface W1 is good or bad, based on the calorimetric value indicated by the irregularly reflected light and the regularly reflected light.

Therefore, the inspection apparatus 1 according to Embodiment 1 can acquire the calorimetric value of the target surface W1 without using an expensive device such as a spectrocolorimeter. In addition, even though the target surface W1 is printed by the inks in various colors and with various film thicknesses, the inspection apparatus 1 according to Embodiment 1 can accurately acquire the calorimetric value of the target surface W1, and therefore accurately know the printed state of the target surface W1.

Consequently, the inspection apparatus 1 according to Embodiment 1 can easily and accurately know and inspect the printed state of the target surface W1.

Moreover, for the inspection apparatus 1 according to Embodiment 1, the target surface W1 includes a metallic shiny base on which printing is applied. That is, even though the base of the target surface W1 is made of a material having a high regular reflectance, the inspection apparatus 1 according to Embodiment 1 can sufficiently secure the responsiveness to the film thickness of the ink, and therefore know the printed state of the target surface W1. Consequently, even though the base of the target surface W1 is made of a material having a high regular reflectance, the inspection apparatus 1 according to Embodiment 1 can easily and accurately know and inspect the printed state of the target surface W1.

Other Embodiments

Hereinafter, the inspection apparatus 1 according to Embodiment 2 and Embodiment 3 will be described. The components and operations of the inspection apparatus 1 according to Embodiments 2 and 3 which are the same as those of the inspection apparatus 1 according to Embodiment 1 will not be described to avoid repeated description.

Figure 11:
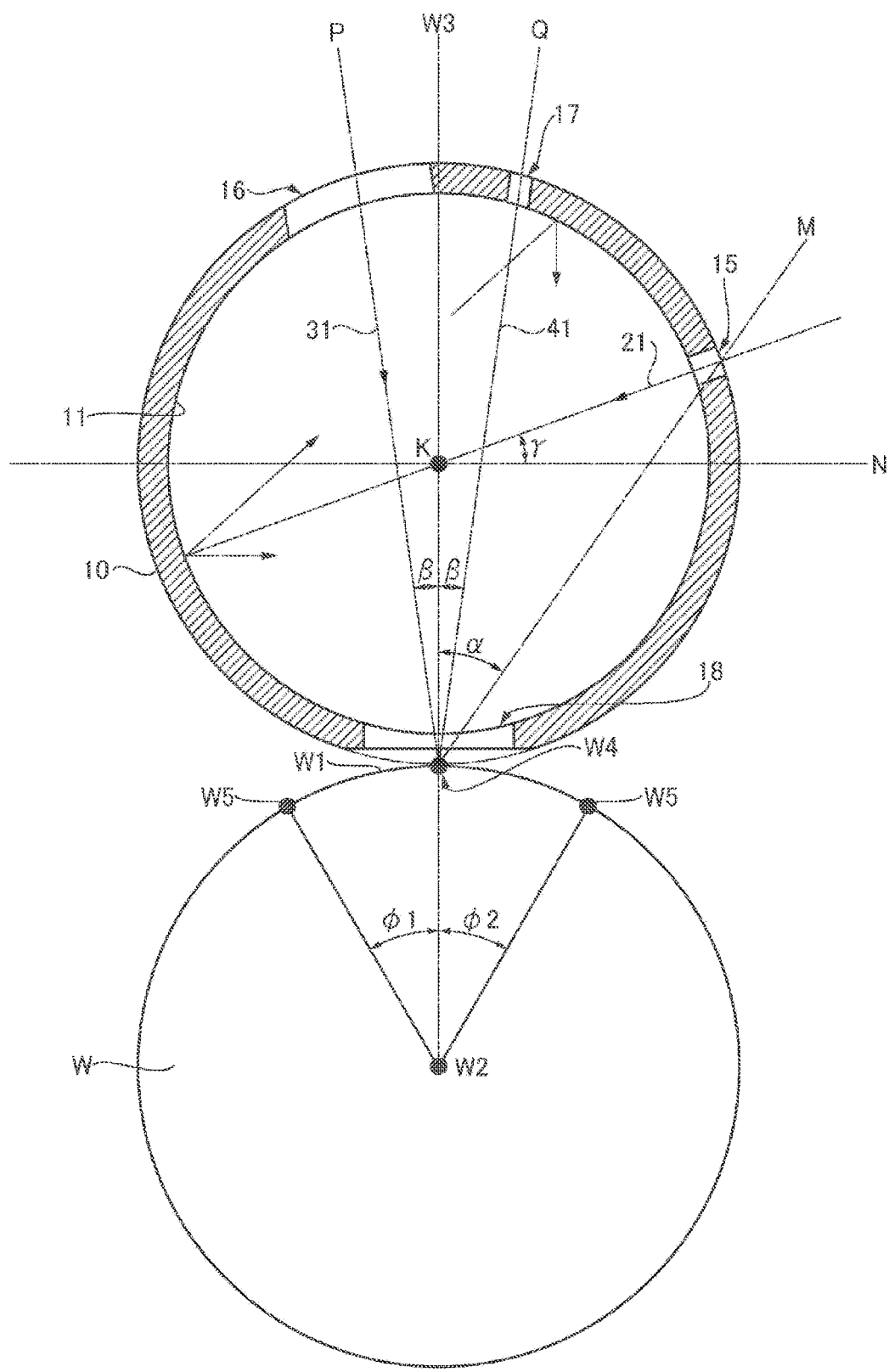
FIG. 11 illustrates an imaging device provided in the inspection apparatus according to Embodiment 2.

FIG. 11 illustrates the imaging device 5 provided in the inspection apparatus 1 according to Embodiment 2.

In the imaging device 5 according to Embodiment 1, as illustrated in FIG. 4, the second light source 30 and the line sensor 40 are disposed such that the intersection of the optical axis 31 of the second light source 30 and the optical axis 41 of the line sensor 40 is located on the reference generating line W4. By this means, the direct light emitted from the second light source 30 can be regularly reflected from the target surface W1 and appropriately received by the line sensor 40, and therefore the imaging device 5 according co Embodiment 1 can correctly acquire the colorimetric value of the target surface W1 and accurately know the printed state of the target surface W1.

Meanwhile, in the imaging device 5 according to Embodiment 2, the second light source 30 and the line sensor 40 are disposed such that the intersection of the optical axis 31 of the second light source 30 and the optical axis 41 of the line sensor is located within a predetermined range of the target surface W1 facing the diffuser 10. To be more specific, as illustrated in FIG. 11, the second light source 30 and the line sensor 40 are disposed such that the intersection of the optical axis 31 of the second light source 30 and the optical axis 41 of the line sensor 40 is not located on the reference generating line W4, but is located within a range sectioned by a pair of generating lines W5 on the target surface W1. The pair of generating lines W5 is obtained by rotating the reference generating line W4 around the curvature center line W2 along the circumferential direction of the target surface W1 as the rotation axis counterclockwise to the second light source 30 by a predetermined angle $\varphi1$, and clockwise to the first light source 20 by a predetermined angle $\varphi2$.

It is preferred that the predetermined angle $\varphi1$ is the same as the angle $\beta$ for the regularly reflected light. This is because, when the predetermined angle $\varphi1$ is equal to or greater than the angle $\beta$, the light regularly reflected from the target surface 1 interferes with the second light source 30, and therefore may not be appropriately received by the line sensor 40. In addition, it is preferred that the predetermined angle $\varphi2$ is $(\alpha+\beta)/2$. This is because, when the predetermined angle $\varphi2$ is equal to or greater than $(\alpha+\beta)/2$, the light regularly reflected from the target surface W1 interferes with the first light source 20, and therefore may not be appropriately received by the line sensor 40.

With this configuration, even though the intersection of the optical axis 31 of the second light source 30 and the optical axis 41 of the line sensor 40 is not set on the reference generating line W4, the imaging device 5 according to Embodiment 2 can locate the line sensor 40 in an appropriate position. By this means, with Embodiment 2, it is possible to increase the freedom for the installation location of the imaging device 5, and therefore to easily know the printed state of the target surface W1.

Figure 12:
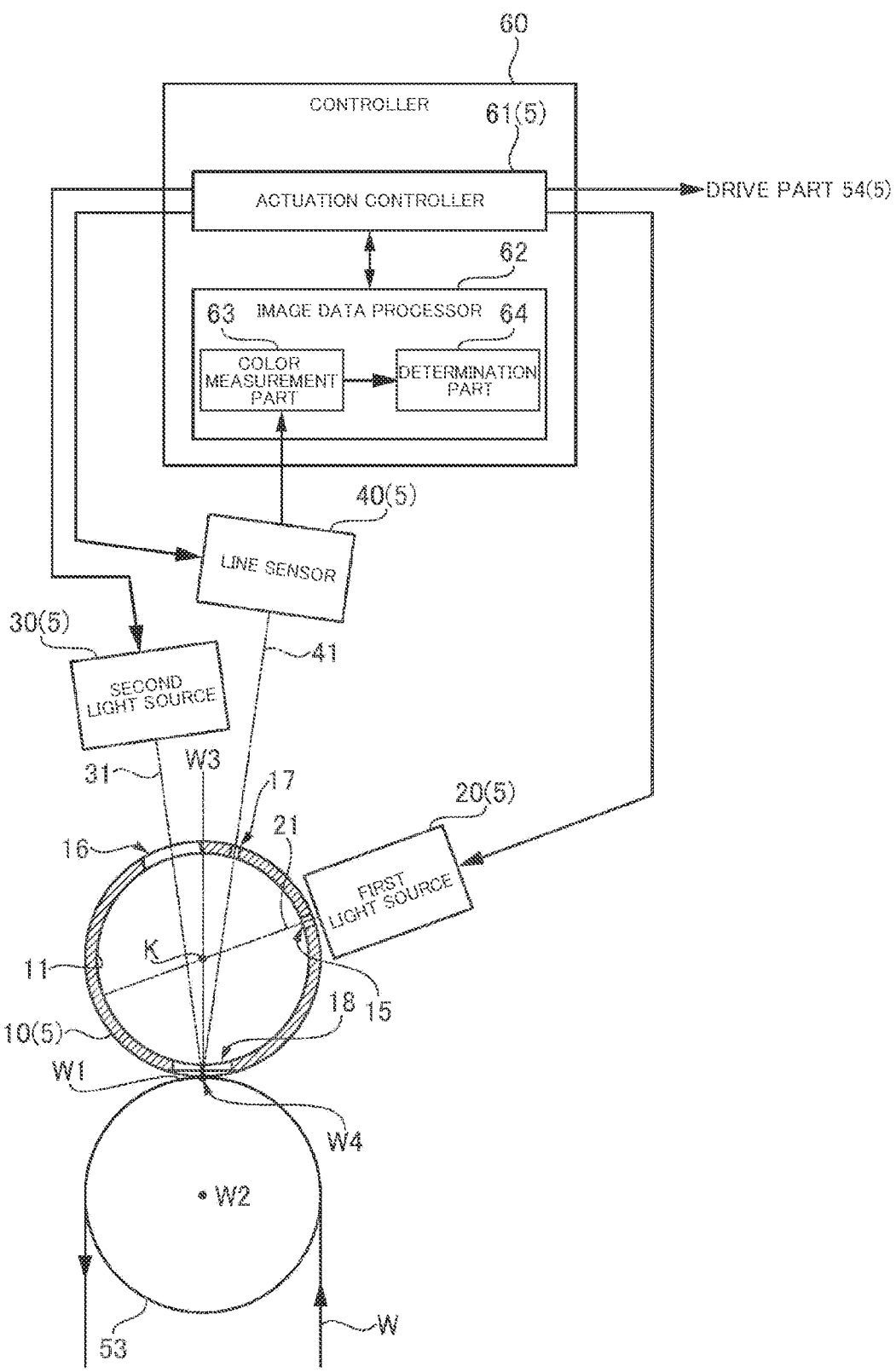
FIG. 12 illustrates the imaging device provided in the inspection apparatus according to Embodiment 3.

FIG. 12 illustrates the imaging device 5 provided in the inspection apparatus 1 according to Embodiment 3.

With the imaging device 5 in the inspection apparatus 1 according to Embodiment 1, the target object F is a metal can, and the target surface W1 is the outer peripheral surface of the metal can with metallic luster. Meanwhile, with the imaging device 5 according to Embodiment 3, as illustrated in FIG. 12, the target object F may be a film-like object or a sheet-like object, and the target surface W1 may be the surface of a film-like object or a sheet-like object. In particular, the target object W according to Embodiment 3 may be a sheet-like object having a surface with metallic luster and used for a pouched product, or a film-like object having a surface with metallic luster and used for the label of a plastic bottle. The metallic luster can be obtained by laminating an aluminum deposition layer or a metal foil layer onto a film-like object or a sheet-like object.

In addition, with the imaging device 5 according to Embodiment 3, the rotation mechanism 50 may include a roller 53 and a drive part 54, instead of the holder 51 and the drive part 52. The roller 53 has a cylindrical shape, and includes an outer peripheral surface around which the target object W such as a film-like object or a sheet-like object is wound. The surface of the target object W wound around the roller 53 is the target surface W1. The curvature center line W2 of the target surface W1 corresponds to the rotation axis of the roller 53. The drive part 54 is configured to rotate the roller 53, and may be a motor.

With the above-described configuration, even though the target object W is a film-like object or a sheet-like object, the imaging device 5 according to Embodiment 3 can accurately know the printed state of the target surface W1 in the same way as Embodiment 1. Here, the imaging device 5 according to Embodiment 3 performs imaging of the target object W such as a film-like object and a sheet-like object wound around the roller 53. However, this is by no means limiting, but the imaging may be performed on a flat surface between a plurality of rollers.

With the above-described Embodiments 1 to 3, an example where the diffuser 10 is a cylinder has been described, but this is by no means limiting as long as the inner peripheral surface 11 of the diffuser 10 allows the light emitted from the first light source 20 to be diffused. The shape of the cross section of the inner peripheral surface 11 of the diffuser 10 may be an ellipse, a half circle, and a half cylinder.

Moreover, with the above-described Embodiments 1 to 3, for the inspection apparatus 1, the line sensor 40 acquires the image data of the target surface W1, and the color measurement part 63 acquires the calorimetric value of the target surface W1 based on the image data, but this is by no means limiting. For the inspection apparatus 1, the line sensor 40 may have the function of the color measurement part 63 to function as a colorimeter. In this case, the line sensor 40 does not acquire the image data of the target surface W1, but the inspection apparatus 1 may directly acquire the colorimetric value of the target surface W1 by using the photometric tristimulus colorimetry or the spectrocolorimetry, and output the acquired calorimetric value to the determination part 64. According to the invention, it is possible to easily and accurately know the printed state of the target surface.

OTHERS

The above-described embodiments including a modification may apply their features to each other. The above-described embodiments are not intended to limit the subject matter of the invention but may be modified to the extent not to depart from the scope of the claims.

The terms used in the above-described embodiments and the claims should be construed as non-exclusive terms. For example, the term "including" should be construed not to limit the subject described as being included. The term "containing" should be construed not to limit the subject described as being contained. The term "comprising" should be construed not to limit the subject described as being comprised. The term "having" should be construed not to limit the subject as being had.

The invention claimed is:

1. An imaging device configured to image a printed state of a target surface of a target object for inspection, the imaging device comprising:
   a first light source;
   a diffuser including an inner periphery surface covered with a diffuse reflection material, and configured to diffusely reflect light emitted from the first light source and emit diffusely reflected light to the target surface;
   a line sensor configured to receive light resulting from reflecting the diffusely reflected light from the target surface; and a movement mechanism configured to move the target surface relative to the line sensor in a direction intersecting an array direction of light-receiving elements of the line sensor, wherein:
at least part of the target surface is a curved surface being convex to the diffuser and having a center of curvature on an axis along a longitudinal direction of the diffuser; and
the movement mechanism rotates the target object around the center of curvature of the target surface as a rotation axis.

2. The imaging device according to claim 1, wherein at least part of the inner peripheral surface of the diffuser is a curved surface having a center of curvature on a central axis of the diffuser.

3. The imaging device according to claim 1, wherein:
the first light source is disposed more apart from the target surface than a plane being orthogonal to a normal line of the target surface at a position closest to the diffuser and containing a central axis of the diffuser; and
an optical axis of the first light source extends to a position of the inner peripheral surface closer to the target surface than the plane.

4. The imaging device according to claim 1, wherein the target surface includes a metallic shiny base on which printing is applied.

5. The imaging device according to claim 1, further comprising a second light source, wherein:
the second light source is disposed such that light emitted from the second light source is regularly reflected from the target surface with respect to the line sensor;
the diffuser allows the light emitted from the second light source not to be reflected from the inner peripheral surface of the diffuser but to pass through the diffuser to enter the target surface as direct light; and
the line sensor receives light resulting from regularly reflecting the direct light from the target surface.

6. The imaging device according to claim 5, wherein:
at least part of the target surface is a curved surface being convex to the diffuser and having a center of curvature on an axis along a longitudinal direction of the diffuser; and
the second light source and the line sensor are disposed such that an intersection of an optical axis of the second light source and an optical axis of the line sensor is located within a predetermined range of the target surface facing the diffuser.

7. The imaging device according to claim 5, wherein:
the first light source is disposed such that its optical axis extends from an outside of the diffuser to the inner peripheral surface of the diffuser;
the second light source is disposed such that its optical axis forms a certain angle with respect to a normal line of the target surface at a position closest to the diffuser and extends from the outside of the diffuser to the target surface;
the line sensor is disposed such that its optical axis forms an angle which is the same as the certain angle with respect to the normal line of the target surface, and extends from the outside of the diffuser to the target surface, and an array direction of its light-receiving elements extends along a longitudinal direction of the diffuser; and
the diffuser includes:
a first light source port formed in a slit shape extending along the longitudinal direction of the diffuser, and configured to allow light emitted from the first light source to the inner peripheral surface to enter into the diffuser;
a second light source port formed in a slit shape extending along the longitudinal direction of the diffuser, and configured to allow light emitted from the second light source to the target surface to enter into the diffuser;
a target surface port formed in a slit shape extending along the longitudinal direction of the diffuser, the target surface port being configured to allow the diffusely reflected light from the inner peripheral surface and light entering from the second light source port to be emitted to the target surface as direct light, and allow light resulting from reflecting the diffusely reflected light and the direct light from the target surface to enter into the diffuser; and
a line sensor port formed in a slit shape extending along the longitudinal direction of the diffuser, and configured to allow the light resulting from reflecting the diffusely reflected light and the direct light from the target surface to be emitted to the line sensor.

8. The imaging device according to claim 7, wherein a length Y1 of the second light source port along the longitudinal direction of the diffuser satisfies the following relationship:

$$Y1 \geq 2(A+D)\tan(\theta/2) + H$$

where A denotes a distance from the target surface to the diffuser; D denotes a diameter of the diffuser; θ denotes an angle of field of the line sensor with respect to the target surface; and H denotes a length of the target surface in the array direction of the light-receiving elements of the line sensor.

9. The imaging device according to claim 7, wherein a length Y2 of the second light source along the longitudinal direction of the diffuser satisfies the following relationship:

$$Y2 \geq 2L\tan(\theta/2) + H$$

where θ denotes an angle of field of the line sensor with respect to the target surface; H denotes a length of the target surface in the array direction of the light-receiving elements of the line sensor; and L denotes a distance from the target surface to the second light source.

10. The imaging device according to claim 5, further comprising a controller,
the controller including:
a processor; and
a memory configured to be able to communicate with the processor, wherein the processor is configured to:
turn on the first light source and the second light source, and allow light resulting from reflecting diffusely reflected light and direct light from the target surface to be received by the line sensor to acquire first image data in a first mode; and
turn on the first light source and turn off the second light source, and allow irregularly reflected light resulting from reflecting the diffusely reflected light from the target surface to be received by the line sensor to acquire second image data in a second mode.

11. The imaging device according to claim 10, wherein:
at least part of the target surface is a curved surface being convex to the diffuser and having a center of curvature on an axis along the longitudinal direction of the diffuser; and
the processor further configured to:
control a movement mechanism to move the target surface relative to the line sensor in a direction intersecting an array direction of light-receiving elements of the line sensor; and
actuate the movement mechanism to rotate the target object in a circumferential direction several times around the center of curvature of the target surface as a rotation axis, in synchronization with actuation of the first light source, the second light source, and the line sensor, in each of the first mode and the second mode.

12. The imaging device according to claim 10, wherein:
the processor further configured to:
acquire a first colorimetric value of the target surface based on the first image data, and a second colorimetric value of the target surface based on the second image data; and
determine whether the printed state is good or bad based on whether one of the first colorimetric value and the second colorimetric value falls within a predetermined tolerance, depending on the target surface.

13. The imaging device according to claim 12, wherein:
the processor further configured to:
determine, for an area of the target surface printed in at least white, whether the printed state is good or bad by determining whether the second colorimetric value falls within the predetermined tolerance; and
determine, for an area other than the area of the target surface determined about whether the printed state is good or bad by using the second colorimetric value, whether the printed state is good or bad by determining whether the first colorimetric value falls within the predetermined tolerance.

14. An inspection method of inspecting a printed state of a target surface, comprising:
illuminating the target surface with diffusely reflected light resulting from diffusely reflecting light emitted from a first light source in a diffuser;
receiving reflected light containing regularly reflected light and irregularly reflected light from the target surface by a line sensor to acquire first image data; and
determining whether the printed state is good or bad, based on a first colorimetric value indicated by the first image data, wherein:
at least part of the target surface is a curved surface protruding to the diffuser and having a center of curvature on an axis along a longitudinal direction of the diffuser; and
the printed state of the target surface is inspected while the target surface is rotated around the center of curvature as a rotation field.

15. The inspection method according to claim 14, wherein the regularly reflected light results from reflecting direct light emitted from a second light source from the target surface.

16. The inspection method according to claim 14, further comprising determining, for an area of the target surface printed in at least a color other than white, whether the printed state is good or bad based on the first colorimetric value.

17. An inspection method of inspecting a printed state of a target surface, comprising:
illuminating the target surface with diffusely reflected light resulting from diffusely reflecting light emitted from a first light source in a diffuser;
receiving, by a line sensor, only irregularly reflected light and excluding regularly reflected light from a second light source, the irregularly reflected light resulting from reflecting the diffusely reflected light from the target surface by a to the line sensor to acquire image data; and
determining whether the printed state is good or bad, based on a colorimetric value indicated by the image data.

18. The inspection method according to claim 17, further comprising determining, for an area of the target surface printed in at least white, whether the printed state is good or bad, based on the colorimetric value.

19. An inspection method of inspecting a printed state of a target surface, comprising:
illuminating the target surface with diffusely reflected light resulting from diffusely reflecting light emitted from a first light source in a diffuser;
receiving reflected light containing regularly reflected light and irregularly reflected light from the target surface by a line sensor to acquire first image data;
illuminating the target surface with diffusely reflected light resulting from diffusely reflecting the light emitted from the first light source in the diffuser;
receiving only the irregularly reflected light excluding the regularly reflected light, resulting from reflecting the diffusely reflected light from the target surface by the line sensor to acquire second image data; and
determining whether the printed state is good or bad, based on a first colorimetric value indicated by the first image data and a second colorimetric value indicated by the second image data.

20. The inspection method according to claim 14, wherein the target surface includes a metallic shiny base on which printing is applied.

21. An imaging device configured to image a printed state of a target surface of a target object for inspection, the imaging device comprising:
a first light source;
a diffuser including an inner periphery surface covered with a diffuse reflection material, and configured to diffusely reflect light emitted from the first light source and emit diffusely reflected light to the target surface;
a line sensor configured to receive light resulting from reflecting the diffusely reflected light from the target surface; and
a second light source, wherein:
the second light source is disposed such that light emitted from the second light source is regularly reflected from the target surface with respect to the line sensor;
the diffuser allows the light emitted from the second light source not to be reflected from the inner peripheral surface of the diffuser but to pass through the diffuser to enter the target surface as direct light; and
the line sensor receives light resulting from regularly reflecting the direct light from the target surface.

22. An inspection method of inspecting a printed state of a target surface, comprising:
illuminating the target surface with diffusely reflected light resulting from diffusely reflecting light emitted from a first light source in a diffuser;
receiving reflected light containing regularly reflected light and irregularly reflected light from the target surface by a line sensor to acquire first image data;

illuminating the target surface with direct light emitted from a second light source, not to be reflected from the inner peripheral surface of the diffuser but to pass through the diffuser;

receiving reflected light containing regularly reflected light from the target surface by a line sensor to acquire second image data; and determining whether the printed state is good or bad, based on a first colorimetric value indicated by the first image data and a second colorimetric value indicated by the second image data.

\* \* \* \* \*